US010560551B2

(12) United States Patent
Haserodt et al.

(10) Patent No.: US 10,560,551 B2
(45) Date of Patent: *Feb. 11, 2020

(54) SERVICES VERSIONING

(71) Applicant: Avaya Inc., Santa Clara, CA (US)

(72) Inventors: Kurt Haserodt, Westminster, CO (US); William T. Walker, Evergreen, CO (US); John Meiners, Boulder, CO (US); Renee Krahn, Superior, CO (US); Donald E. Gillespie, Boulder, CO (US)

(73) Assignee: Avaya Inc., Basking Ridge, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 15/815,333

(22) Filed: Nov. 16, 2017

(65) Prior Publication Data

US 2018/0077262 A1 Mar. 15, 2018

Related U.S. Application Data

(63) Continuation of application No. 15/017,338, filed on Feb. 5, 2016, now Pat. No. 9,826,062, which is a continuation of application No. 13/624,923, filed on Sep. 22, 2012, now Pat. No. 9,262,150, and a continuation of application No. 14/985,013, filed on Dec. 30, 2015, now Pat. No. 9,826,061, which is a
(Continued)

(51) Int. Cl.
*G06F 15/173* (2006.01)
*H04L 29/08* (2006.01)
*G06F 8/60* (2018.01)
*G06F 8/65* (2018.01)

(52) U.S. Cl.
CPC ............... *H04L 67/34* (2013.01); *G06F 8/60* (2013.01); *G06F 8/65* (2013.01); *H04L 67/02* (2013.01)

(58) Field of Classification Search
CPC .......... G06F 8/65; G06F 8/70–71; G06F 8/60; H04L 41/5054; H04L 67/16; H04L 67/34; H04L 67/02
USPC ............... 709/202–203, 223–226; 707/695; 717/170
See application file for complete search history.

(56) References Cited

U.S. PATENT DOCUMENTS

| 5,706,431 A | 1/1998 | Otto |
| 8,214,451 B2* | 7/2012 | Grossner ............... H04L 67/16 709/225 |
| 8,255,549 B2 | 8/2012 | Gorti et al. |

(Continued)

OTHER PUBLICATIONS

JSR 289 Expert Group, SIP Servlet Specification, version 1.1, http://jcp.org/aboutJava/communityprocess/final/jsr289/index.html.
(Continued)

*Primary Examiner* — Bharat Barot
(74) *Attorney, Agent, or Firm* — Sheridan Ross P.C.

(57) ABSTRACT

Downloadable pluggable services and methods of distributing the same are described. The downloadable pluggable services may correspond to communication services that can be downloaded to upgrade a communication system. The downloadable pluggable services may include a number of component parts that can be distributed among various servers in the communication system being upgraded along with instructions that enable the component parts to instruct each server in the communication system to operate in a coordinated fashion so as to provide the downloaded service.

15 Claims, 13 Drawing Sheets

Related U.S. Application Data continuation of application No. 13/624,923, filed on Sep. 22, 2012, now Pat. No. 9,262,150.

(56) References Cited

U.S. PATENT DOCUMENTS

| | | | |
|---|---|---|---|
| 8,477,942 B2 | 7/2013 | Ramic et al. | |
| 8,688,835 B2 | 4/2014 | Olsson | |
| 9,116,772 B2 | 8/2015 | Ohrstrom-Sandgren et al. | |
| 9,262,150 B2 | 2/2016 | Haserodt et al. | |
| 9,313,245 B2 | 4/2016 | Mandyam et al. | |
| 9,529,578 B2 * | 12/2016 | Smith | G06F 8/65 |
| 9,690,559 B2 | 6/2017 | Haserodt et al. | |
| 9,826,061 B2 * | 11/2017 | Haserodt | H04L 67/34 |
| 9,826,062 B2 * | 11/2017 | Haserodt | H04L 67/34 |
| 2005/0060662 A1 | 3/2005 | Soares et al. | |
| 2005/0160155 A1 | 7/2005 | Geekee et al. | |
| 2006/0020938 A1 | 1/2006 | Elcock et al. | |
| 2006/0174252 A1 * | 8/2006 | Besbris | G06F 8/658 |
| | | | 719/330 |
| 2007/0130274 A1 | 6/2007 | Lee et al. | |
| 2007/0150821 A1 | 6/2007 | Thunemann et al. | |
| 2010/0015992 A1 | 1/2010 | Wakefield | |
| 2010/0138816 A1 | 6/2010 | Mokrani et al. | |
| 2014/0033190 A1 | 1/2014 | Fu et al. | |

OTHER PUBLICATIONS

Official Action for U.S. Appl. No. 13/624,923, dated May 7, 2015 5 pages.
Notice of Allowance for U.S. Appl. No. 13/624,923, dated Nov. 13, 2015 10 pages.
Notice of Allowance for U.S. Appl. No. 15/017,338, dated Jul. 13, 2017 8 pages.
Notice of Allowance for U.S. Appl. No. 14/985,013, dated Jul. 14, 2017 9 pages.

* cited by examiner

SERVICES VERSIONING

CROSS REFERENCE TO RELATED APPLICATION

The present application is a continuation of (a) U.S. patent application Ser. No. 15/017,338, filed Feb. 5, 2016, now U.S. Pat. No. 9,826,062, which is a continuation of U.S. patent application Ser. No. 13/624,923, filed Sep. 22, 2012, now U.S. Pat. No. 9,262,150, and (b) U.S. patent application Ser. No. 14/985,013, filed Dec. 30, 2015, now U.S. Pat. No. 9,826,061, entitled "SERVICES VERSIONING", each of which is incorporated herein by this reference in its entirety.

FIELD OF THE DISCLOSURE

The present disclosure is generally directed toward communications and more specifically toward communication systems and methods.

BACKGROUND

Communication systems have been developed to deliver modular applications that are sequenced or named as part of normal call signaling. The promise to these systems is that many applications can be written for a variety of solution spaces. Heretofore, an application server has only been able to provide one sophisticated application with releases that occur, at best, on a semi-annual basis.

In most communication systems, call treatment features are currently provided by a single, monolithic feature server. Adding a new or upgrading an existing call treatment feature on a server requires a new version of software and requires the customer to upgrade the entire server. Such upgrades can cause operational downtime and can have impacts that are not limited to users of the new/upgraded feature. In other words, current communication systems do not enable convenient system upgrades nor do they enable simple upgrades on a per user basis.

To achieve more rapid development, an ecosystem that allows for the independent development and deployment of applications is desired.

SUMMARY

It is with respect to the above issues and other problems that the embodiments presented herein were contemplated. In particular, embodiments of the present disclosure propose the ability to, among other things, allow different users of the same communication system to have different services and different versions the same service made available to them. Specifically, different subsets of users can have different services and/or service versions made available to them where the services include, for instance, a call processing piece, user interface piece, and management piece.

In some embodiments, this is made possible by the fact that a communication system administrator can download a new service or new version of an existing service and the necessary portions of that service or version are installed at the appropriate devices in the communication system. The administrator can then assign the new service or service version to specific users or groups of users, but exclude other users or groups of users.

One advantage of the present disclosure is that a new version of a service can be tested-out on a single user rather than testing the new version of the service system-wide as is currently required. Because the new version of the service can be slowly rolled out (e.g., for a single user at a time), there is a much smaller impact associated with service upgrades. Furthermore, the bugs can be worked out for a small group of users before upgrading all users of the system.

It is another aspect of the present disclosure to provide the ability to have a hot deploy (no downtime during the upgrade) of a new service version or a completely new service.

As one example of a hot deployment of a service, a user that receives an upgrade may have that upgrade assigned to them during a call and the upgrade will be completed in the background during the call such that once the user is done with the call, the new service is readily available. In particular, the upgrade process enables each component of the new service to be distributed to the appropriate component and installed, without replacing the previous version of the same service. Therefore, if the service happens to be deployed while an affected user is in the middle of a call, the affected user will continue that call using the old service version. After, the user has completed the call, the user will have access to the new version of the service.

Furthermore, a service can be assigned to a small set of users. When it becomes desirable to move the service to a bigger group of users, all that is required is to change permissions for the newly-assigned individuals. There is no need to deploy any further software on every user's device and, again, this can be done during runtime.

As can be appreciated, a new service should be considered an upgrade of the existing overall general functionality. Therefore, embodiments of the present disclosure cover both upgrades to existing services as well as new services.

In some embodiments, a pluggable service includes a call-processing component, a user component, a management component, and a template component. In some embodiments, the "template component" is what gets added to/plugged into the existing templates based on the new service/version. As used herein, a template may comprise multiple template components, where each template component corresponds to different deployed service or service version. Administrators create one or more templates with specific services enabled and specific configuration settings for those services. By creating this template and assigning it to one or more users, the administrator is able to control exactly what services and settings each user receives. Therefore, the administrator gets to select a service version or groups of service versions on behalf of the user.

If an administrator defines, via the templates, that a user is allowed to have one of multiple different service versions, then the user may be allowed to select which service version he/she uses. In this example, the templates allow the system administrator to define which versions a user is allowed to use and the users can then select which specific version of a service they actually use via the user interface component.

In some embodiments, a pluggable service may have its different components packaged into a specific file format such as a JAR or WAR file. For instance, a Dynamic Device Pairing (DDP) 'service' jar may include a call processing piece, a service rule piece, a user portal/interface piece, the system manager's or administrator's piece, and perhaps other components (e.g., country specific components, language components, etc.). Instead of including all possible sub-components (e.g., all skins, all languages) into the overall service jar, the user could pick and chose the ones he/she wants, resulting in a very specialized service. For instance, if the user wants a Swedish look and feel to their user portal, he/she could specify that when ordering the overall service, and the entity which distributes the service would build the service with only that skin. Other pieces could be changed as well, for example, the service rule. Dynamic customization allows a service to have multiple personalities that can be tailored to individual customers. The customer might want to affect that behavior as well.

Other aspects of the present disclosure include the ability for an independent party to develop localization packages for the customer to download as well as the concept of pluggable licensing.

Here the customer or system administrator would be able to specify customization of a pluggable service at ordering time (e.g., how many users can use the service, which users will use the service, etc.). It may also be possible to include the license in the service (or different sub-components of the service) and dynamically create the appropriate bundle at ordering time.

Another aspect of the present disclosure is that there may be data attributes defined by or for a service. In some embodiments, each attribute has the listed levels in the hierarchy and a factory default may be used. Administrators and users are allowed to configure this same data. In general, the user configured value will override the admin value, but the administrator can specify that a certain piece of data is not user-configurable or only user-configurable within a predetermined range.

Yet another aspect of the present disclosure is to avoid the need to use a substantial amount of html code to paint or render a screen for a user in connection with providing a service. In particular, an eXtensible Markup Language (XML) can be used to define the data that will be manipulated by a system administrator or user. The html code can be pre-stored on a system manager of the communication system. The updates provided by a pluggable service only has to define, in an abstract language, what data the html code is required to look at and then the html code is used to look at the abstract language to perform the defined functions.

Because the attribute definitions describing what is going to be displayed requires less code-space than the html code itself, the pluggable service can be kept at a minimal size. Another benefit is ease of development of a new service. For example, only data elements need to be defined, rather than developing, testing, and delivering html code.

In accordance with at least some embodiments of the present disclosure, a method is provided which generally comprises:
a. receiving a request from a customer to obtain a downloadable pluggable service for a communication system of the customer;
b. in response to receiving the request, preparing the downloadable pluggable service, wherein preparing the downloadable pluggable service includes obtaining a first and second sub-component that are packaged into a single object, wherein the first sub-component includes instructions for operating a first server of the customer's communication system, and wherein the second sub-component includes instructions for operating a second server of the customer's communication system; and
c. transmitting the single object to the customer.

In accordance with at least some embodiments of the present disclosure, a method is provided which generally comprises:
a. providing a communication system to a plurality of users;
b. defining, for a first user, or group of users, in the plurality of users, a first set of enabled services that the first user, or group of users, is allowed to access from the communication system;
c. defining, for a second user, or group of users, in the plurality of users, a second set of enabled services that the second user, or group of users, is allowed to access from the communication system, wherein the first set of enabled services differs from the second set of enabled services by at least one service; and
d. enforcing the first and second sets of enabled services for the first and second users, or group of users, use of the communication system.

In accordance with at least some embodiments of the present disclosure, a method is provided which generally comprises:
a. receiving a service for a first user; and
b. loading the service for the first user onto one or more servers without requiring the first user to log off or discontinue a communication session.

Although embodiments of the present disclosure will be primarily described in connection with communication services or communication systems, it should be appreciated that "services" as used herein can include any type of feature or feature set that is made available to a user or group of users either within a single enterprise or within multiple enterprises. Non-limiting examples of services include communication services (e.g., call routing services, call-enhancing features, conferencing services, security/encryption services, firewall services, multi-media communication services, collaboration services, etc.), http-type services (e.g., web-browsing services, web-collaboration services, etc.), media services, data storage services, and any other service that can be supported or provided by a server or collection of servers that provide users or client devices with content or features to enhance operations of the client device or systems exposed to the client device.

Furthermore, the term "server" as used herein should be understood to include any server, collection of servers, processors within a server, blades within a server, one or more virtual machines being executed by a server, containers or processes being executed by a server, etc. In other words, "servers" are not necessarily limited to individual hardware components with dedicated processors and memory. "Servers" are also not limited to a particular type of container executed by a server, such as a J2EE server or any other version of a Java EE server. Non-limiting examples of containers that may be executed by or constitute a server include application containers (e.g., Java Virtual Machines), applet containers (e.g., web browsers or applet viewers), Enterprise JavaBeans (EJB) containers, web containers, Application Programming Interfaces (APIs), and the like.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation.

Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
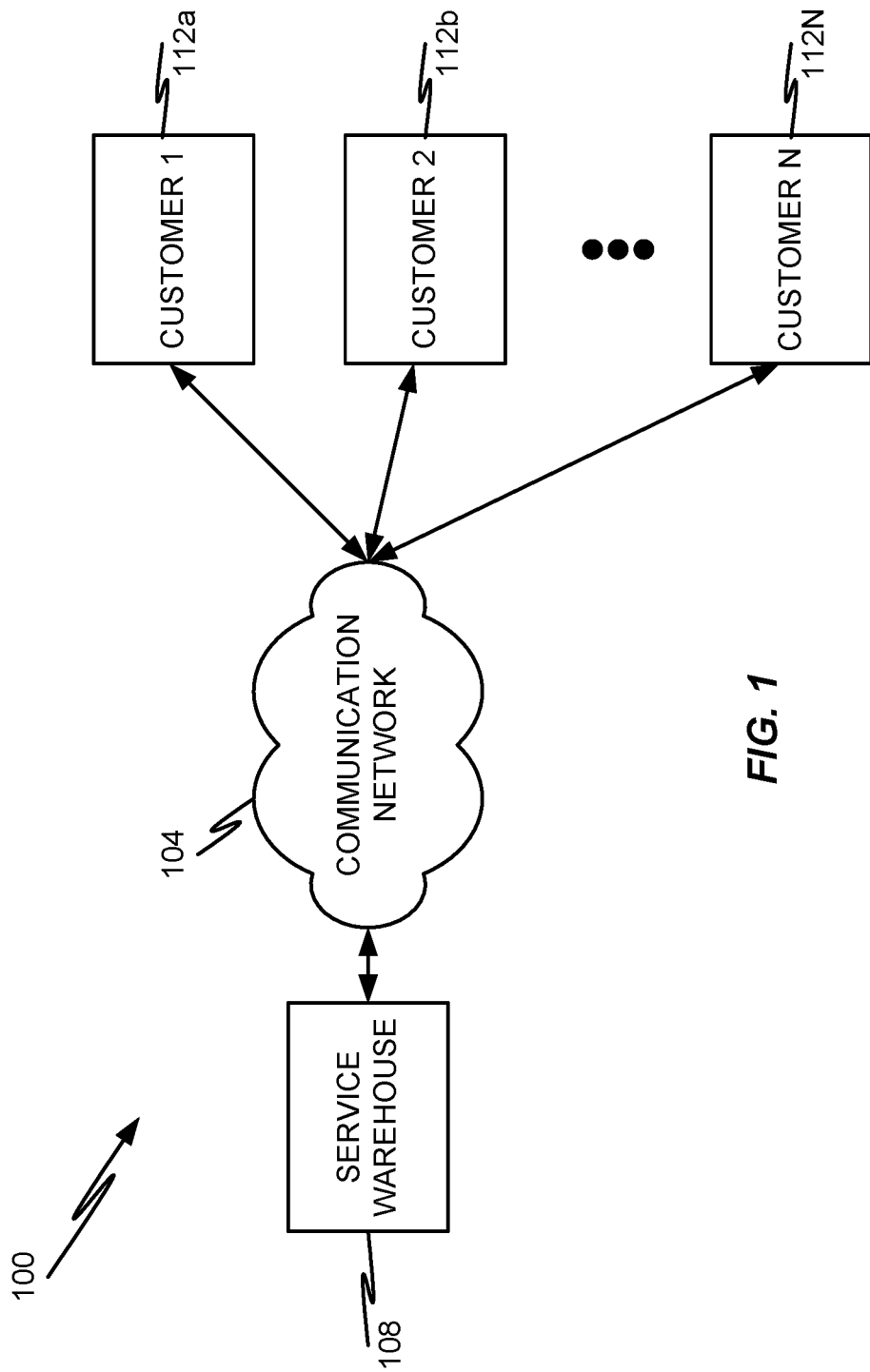
FIG. 1 is a block diagram of a first communication system in accordance with embodiments of the present disclosure.

FIG. 1 shows an illustrative embodiment of a communication system 100 in accordance with at least some embodiments of the present disclosure. The communication system 100 may be a distributed system and, in some embodiments, comprises one or more communication networks 104 that facilitate communications between a service warehouse 108 and one or more customers or customer sites 112a-N.

The communication network 104 may be packet-switched and/or circuit-switched. An illustrative communication network 104 includes, without limitation, a Wide Area Network (WAN), such as the Internet, a Local Area Network (LAN), a Personal Area Network (PAN), a Public Switched Telephone Network (PSTN), a Plain Old Telephone Service (POTS) network, a cellular communications network, an IP Multimedia Subsystem (IMS) network, a SIP network, a Voice over IP (VoIP) network, or combinations thereof. In one configuration, the communication network 104 is a public network supporting the TCP/IP suite of protocols. Communications supported by the communication network 104 include real-time, near-real-time, and non-real-time communications. For instance, the communication network 104 may support voice, video, text, web conferencing, or any combination of media.

The service warehouse 108 may provide a location where customers 112a-N can view and ultimately purchase services. Examples of services that may be offered by the service warehouse 108 include communication services, media services, management services, data storage services, processing services, combinations thereof, and any other automated or computer-implemented service. In some embodiments, the service warehouse 108 may provide access to its services via one or more web pages served by a web server or group of web servers. The service warehouse 108 may provide customers 112a-N with the ability to view various services offered by the service warehouse 108 though known web-based communication protocols (e.g., http, secure http, etc.). The customers 112 a-N may comprise one or more client devices with a web-browser application executed thereon that allows user or system administrators at the customer site to view and purchase services from the service warehouse 108.

As will be discussed in further detail herein, the service warehouse 108 may comprise the functionality to receive an order for one or more services from a customer 112 a-N, automatically prepare one or more downloadable pluggable services, and send the downloadable pluggable services to the ordering customer 112 a-N via the communication network 104. In some embodiments, the service warehouse 108 may provide the ordered service(s) to the customer 112 a-N via the same or similar protocol used by the customer 112 a-N to order the service(s). It may also be possible for the service warehouse 108 to provide the ordered service(s) to the customer 112 a-N in the same communication session during which the order was received. In other words, the service warehouse 108 may deliver the ordered service(s) via the same port negotiated during the web-based communication session that was used to order the service(s). This provides a simple and efficient way of delivering services from the service warehouse 108 to the customer 112 a-N.

It should be appreciated that the service warehouse 108 may be distributed. Although embodiments of the present disclosure will refer to a single service warehouse 108 as the mechanism by which services are delivered to customers, it should be appreciated that the embodiments claimed herein are not so limited. For instance, multiple service warehouses 108 may be executed by multiple different servers in either an autonomous or coordinated fashion. One customer may communicate with one instance of the service warehouse 108 whereas another customer may communicate with another instance of the service warehouse 108.

Figure 2:
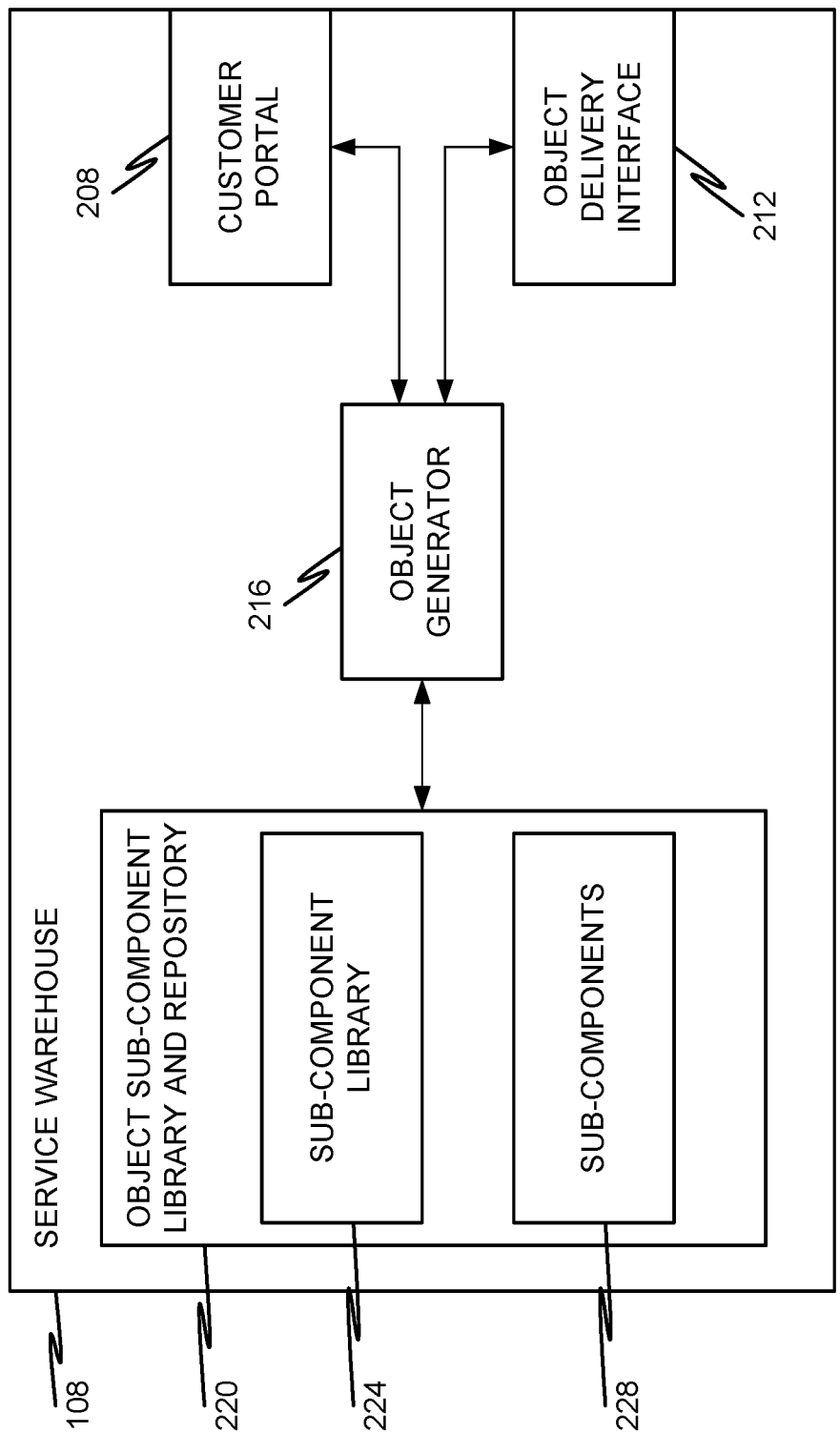
FIG. 2 is a block diagram of a service warehouse in accordance with embodiments of the present disclosure.

With reference now to FIG. 2, additional details of a service warehouse 108 will be described in accordance with embodiments of the present disclosure. A service warehouse 108 may comprise a customer portal 208, an object delivery interface 212, an object generator 216, and an object sub-component library and repository 220. Although the customer portal 208 and object delivery interface 212 are depicted as being separate and distinct components, which they may be, it should be appreciated that some instances of a service warehouse 108 may comprise a single component that acts as both a customer portal 208 and object delivery interface 212.

The customer portal 208 provides the service warehouse 108 with the ability to expose available services to customers 112 a-N as well as receive orders for services from customers 112 a-N. In some embodiments, the customer portal 208 may comprise a web interface (e.g., one or more web pages configured to be provided to the customer 112 a-N via a markup language, for example), a web server, a group of web servers, a communication port, a communication socket, or any other combination of hardware and/or software components that enable a customer 112 a-N to remotely view contents of the service warehouse 108.

More specifically, the customer portal 208 may enable a customer 112 a-N to view contents of the object sub-component library and repository 220 or a listing of services that can be provided to the customer 112 a-N via sub-components 228 listed within the sub-component library 224 and stored in the object sub-component library and repository 220. Some non-limiting examples of services that can be displayed to a customer 112 a-N via the customer portal 208 and, therefore, ordered by the customer include one or more communication services such as a voicemail service, a call-forwarding service, a dynamic device pairing service, a call-routing service, an extension to cellular service, a speech-to-text service, a text-to-speech service, a call-recording service, a media library, an Interactive Voice Response (IVR) service, a conferencing service, or the like.

While the customer portal 208 enables a customer 112 a-N to view and order services, the object generator 216 is responsible for fulfilling service orders. Specifically, if a customer 112 a-N places an order for a particular service or set of services, the object generator 216 is invoked to gather the necessary sub-components 228 from the object sub-component library and repository 220 and bundle the sub-components 228 into an object that is deliverable directly to the customer 112 a-N via the communication network 104. Even more specifically, when the object generator 216 receives an order for a service, the object generator 216 is configured to determine the type of service that has been ordered and also determine which sub-components 228 will be required to ultimately provide the ordered service to the ordering customer. It should be appreciated that the number and type of sub-components 228 required to provide a particular service to a particular customer may depend upon the type of equipment being used by the customer, the nature of the ordered service, the number of licenses of the service that have been ordered (e.g., how many users at the customer site will use the service), and a number of other factors.

In some embodiments, an object may be custom built by the object generator 216 to accommodate one or more customer-specific requests for the service. As a non-limiting example, assume that a customer has just ordered a new communication service that will have a number of sub-components such as a user portal sub-component, a call-processing sub-component, an administrative or system management sub-component, and a user interface sub-component. One or more of these sub-components may be customized by the object generator 216 to accommodate the specific version of the servers (or processors) that will ultimately execute each sub-component as well as accommodate any special requests made by the ordering customer (e.g., language requests, look-and-feel requests, default rules/preferences, etc.). The object generator 216 is capable of retrieving the appropriate sub-components 228 by referring to the sub-component library 224 and, from that sub-component library 224, determining which sub-components 228 will properly provide the service that has been ordered by the customer.

Figures 6, 7:
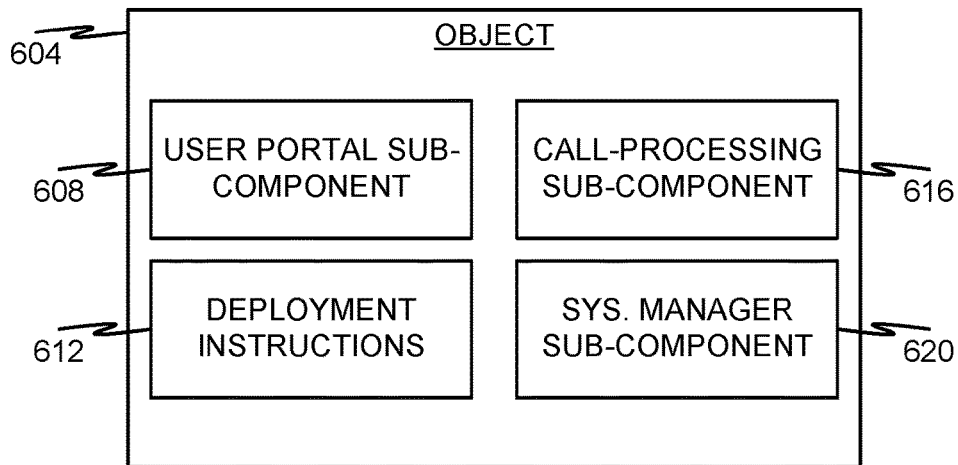
FIG. 6 is a block diagram of a deployable object in accordance with embodiment of the present disclosure.
FIG. 7 is a block diagram depicting a service template in accordance with embodiments of the present disclosure.

One non-limiting example of an object 604 that may be generated by the object generator 216 is depicted in FIG. 6. As discussed above, the object 604 created by the object generator 216 may comprise one or more sub-components that will enable various different servers at the customer's premises to operate in a coordinated fashion to provide the ordered service. Some examples of sub-components that may be included in an object 604 used to deliver a communication service include, without limitation, a user portal sub-component 608, a call-processing sub-component 616, and a system manager sub-component 620. Although not depicted, the object 604 may also comprise a license sub-component that defines the customer's entitlements for using the service (e.g., the number of users that can be assigned the service). The object 604 generated by the object generator 216 may also include deployment instructions 612 that, when followed, will enable the successful deployment of the object 604 at the customer's premises by distributing the sub-components to the appropriate locations/servers.

It should be appreciated that the sub-components 228 may be stored in memory of the service warehouse 108 as files, executables, or the like and the sub-component library 224 may simply correspond to a listing or table of the various sub-components 228 stored in memory. The sub-component library 224 may also provide links or addresses that can be used by the object generator 216 to locate and retrieve the corresponding sub-components 228 from memory. In other words, the sub-component library 224 may include a listing of sub-components 228 as well as indexing mechanisms used to locate the sub-components in storage.

The object delivery interface 212 of the service warehouse 108 provides the object generator 216 with the ability to deliver the object 604 to a customer 112 a-N via the communication network 104. In some embodiments, the object delivery interface 212 may occupy the same hardware components (e.g., socket, port, network interface card, etc.) as the customer portal 208. In some embodiments, the object delivery interface 212 is different from the customer portal 208. In either implementation, the object delivery interface 212 may be configured to package or encapsulate the object 604 generated by the object generator 216 into one or more communication packets or files that are deliverable over the communication network 104. The object delivery interface 212 may also comprise the capability to locate and transmit the object 604 to the ordering customer.

Figure 3:
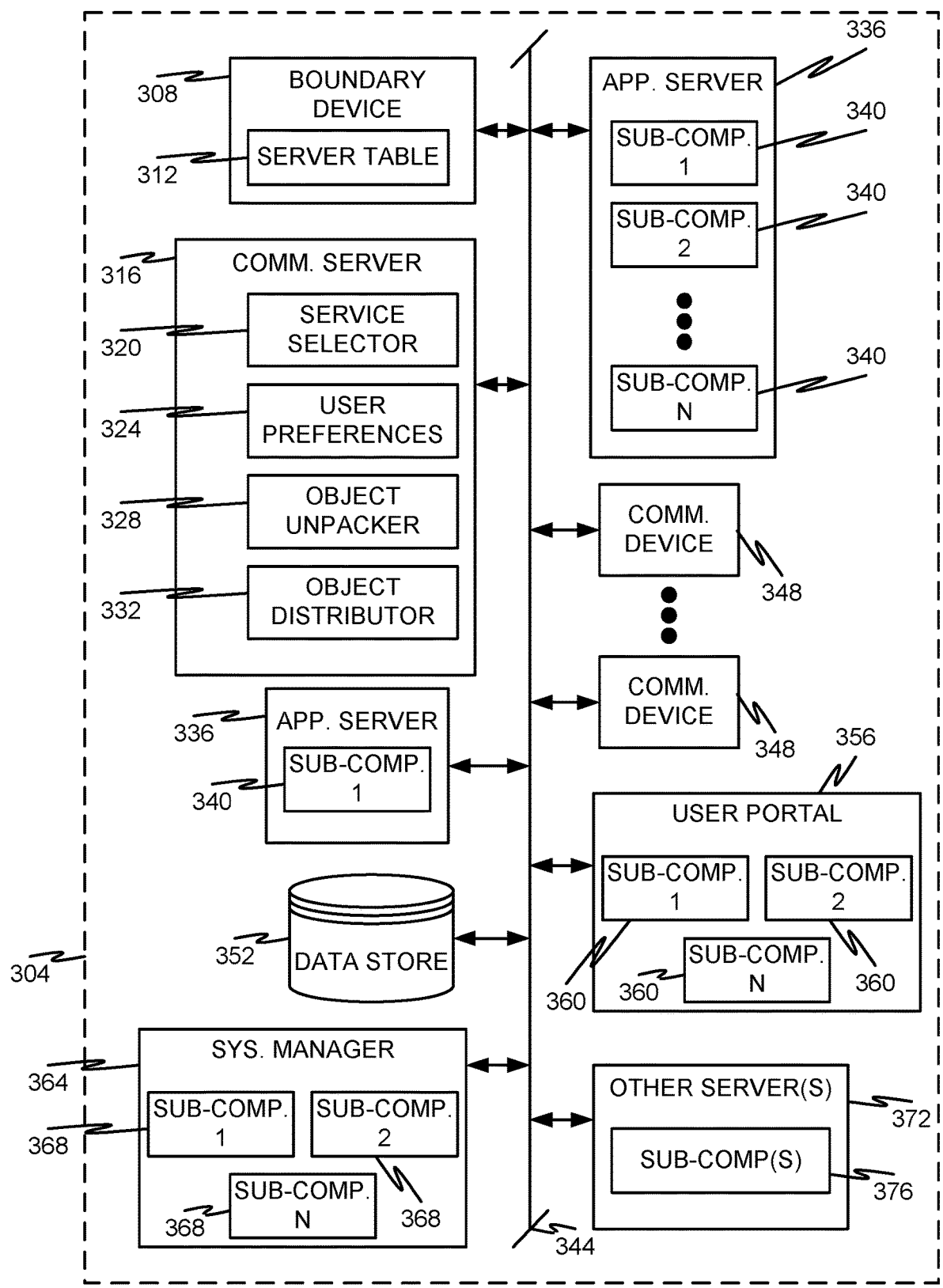
FIG. 3 is a block diagram of a second communication system in accordance with embodiments of the present disclosure.

With reference now to FIG. 3, additional details of an illustrative customer premises 304 will be described in accordance with embodiments of the present disclosure. The customer premises 304 may, in some embodiments, correspond to an enterprise network that is owned and operated by a single customer 112. In other words, a single customer 112 may own, lease, or otherwise solely control the operation and/or maintenance of the communication devices contained within the boundaries of the customer premises 304. Such a customer premises 304 is commonly referred to as an enterprise network. The enterprise network may be distributed (e.g., a WAN) or it may be confined to a single location (e.g., a LAN). In other embodiments, multiple customers 112 a-N share some or all of the components of the customer premises 304.

The premises 304 may correspond to an enterprise network and, in some embodiments, may comprise a network boundary device 308 that includes a server table 312, a communication server 316, one or more servers 336 (e.g., application servers, feature servers, etc.) capable of providing one or multiple services to users, one or more internal communication devices 348, a data store 352, one or more user portal servers 356, one or more system manager servers 364, and one or multiple other servers 372. Some or all of the components of the premises 304 may be interconnected by a (trusted or secure or private) Local Area Network (LAN) 344. Some or all of the functions depicted in FIG. 3 may be co-hosted and/or co-resident on a single server. The depiction of components in FIG. 3 and the other figures provided herein are generally intended to be a logical depiction of the components of the system. It should be appreciated that an enterprise network or multiple enterprise networks may comprise multiple LANs 344 connected via a WAN, such as the communication network 104. A single enterprise communication network 304 is depicted in FIG. 3 and described herein for ease of understanding and simplicity and in no way is intended to limit embodiments of the present invention to a single enterprise network 304.

The LAN 344 can be secured from intrusion by untrusted parties by a gateway and/or firewall located between the LAN 344 and communication network 104. In some embodiments, the boundary device 308 may include the functionality of the gateway and/or firewall. In some embodiments, a separate gateway or firewall may be provided between the boundary device 308 and the communication network 104.

Although only a single instance of each server (e.g., a single communications server 316, a single application server 336, a single user portal 356, and a single system manager 364) is depicted in FIG. 3, two or more instances of any server type may be provided in a single enterprise network 304 or across multiple separate LANs 344 owned and operated by a single enterprise, but separated by communication network 104. In configurations where an enterprise or an enterprise network 304 includes two or more servers of a single type (e.g., multiple communication servers 316), each server may comprise similar functionality, but may be provisioned for providing its features to only a subset of all enterprise users. In particular, as a non-limiting example, a first communications server 316 may be authoritative for and service a first subset of enterprise users whereas a second communications server 316 may be authoritative for and service a second subset of enterprise users, where the first and second subsets of users generally do not share a common user. This is one reason why the network boundary device 308 may be provided with a server table 312—the server table 312 may comprise the information that maps a user to their authoritative communication server 316.

Additionally, multiple servers can support a common user community. For example, in geo-redundant and other applications where users aren't necessarily bound to a single application server, there may be a cluster of equivalent servers where a user can be serviced by any server in the cluster.

The communications server 316 can include a Private Branch eXchange (PBX), an enterprise switch, an enterprise server, components or applications executed within a server, a virtual machine provided by a server, combinations thereof, or other type of telecommunications system switch or server. The communication server 316 is, in some embodiments, configured to enable the execution of telecommunication functions such as the suite of applications and services made available via Avaya Aura™ platform of Avaya, Inc., including Communication Manager™, Avaya Aura Communication Manager™, Avaya IP Office™, Communication Manager Branch™, Session Manager™, Multi-Vantage Express™, and combinations thereof.

In accordance with at least some embodiments of the present disclosure, the mapping of user identities within a communication request does not necessarily have to occur at the network boundary device 308. For instance, the mapping between an authoritative communication server 316 and a user may occur "behind" the network boundary device 308 within the enterprise network 304. In some embodiments, the network boundary device 308 may include functionality similar to a Session Border Controller (SBC), a firewall, gateway, or any other device that provides security and/or translation capabilities.

In some embodiments, network boundary device 308 is responsible for initially routing communications within the enterprise network 304 to the communications server 316 responsible for servicing a particular user involved in a communication session. For example, if a first enterprise user is being called by an external communication device, then the network boundary device 308 may initially receive the inbound call, determine that the call is directed toward the first enterprise user, reference the server table 312 to identify the authoritative communications server 316 for the first enterprise user, and route the inbound call to the authoritative communications server 316. Likewise, communications between internal enterprise users (e.g., internal communication devices 348) may first be serviced by the originating user's authoritative communications server 316 during the origination phase of communications set-up.

After the origination phase is complete, the authoritative communications server 316 of the terminating (or called) user may be invoked to complete the termination phase of communications set-up. In some embodiments, the communications server 316 for the originating and terminating user may be the same, but this is not necessarily required. In situations where more than two enterprise users are involved in a communication session, authoritative communications servers 316 for each of the involved users may be employed without departing from the scope of the present invention. Additionally, the authoritative communications servers 316 for each user may be in the same enterprise network 304 or in different enterprise networks 304, which are owned by a common enterprise but are separated by the communication network 104.

Each communications server 316 may include a service selector 320, user preferences 324, an object unpacker 328, and an object distributor 332. As can be appreciated, various modules of the communications server 316 do not necessarily need to be implemented on the same server. Instead, the modules of the communication server 316 can be implemented in one or more different servers or in different processors within the same server.

The service selector 320 provides the communication server 316 with the ability to route user requests to the appropriate servers 336, 356, 364, 372 within the network 304. Specifically, the service selector 320 may be invoked in response to receiving a request to initiate a communication session (e.g., an INVITE message in a SIP environment, an HTTP GET request, an inbound or outbound phone call, an email message, a Short Message Service (SMS) message, etc.) or a request for some other type of information (e.g., a request for presence information such as via a SUBSCRIBE message, a database query, etc.). Once invoked, the service selector 320 may be configured to refer to the user preferences 324 to determine which server is to be activated next. For example, the communication server 316 may receive a SIP message and the service selector 320 may refer to the user preferences 324 to determine which server 336, 356, 364, 372 is to receive the SIP message next. More specifically, the communication server 316 may be configured to establish a chain of Back-to-Back User Agents (B2BUAs) in at least one of a data and media path of a communication session by sequencing each B2BUA into an application sequence one-by-one until the entire application sequence has been constructed.

The user preferences 324 for a communication server 316 contains the service preferences for each user for which it is authoritative. In the example of a communications service, the user preferences 324 may define which applications from the application server 336 should be invoked for a particular user's application sequence. Other types of user preferences 324 may include User Interface preferences, data retrieval preferences, presence information and privacy preferences, and the like. In some embodiments, the user preferences 324 may be in a table format and may be provisioned by users and/or by administrative personnel. The user preferences 324 for a particular user are referenced by the service selector 320 to determine which, if any, services and what components of that service (e.g., sub-components 340, 360, 368, 376) should be invoked for the user. Again referring to the communication-type service, the service selector 320 may be configured to provide communication features directly into the communication session or determine an application sequence that will be invoked during set-up and used during the communication session.

The object unpacker 328 and object distributor 332 can be used by the communication server 316 to handle objects that are received from the service warehouse 108. It should be appreciated that the object unpacker 328 and object distributor 332 does not necessarily need to reside in the same server, such as the communication server 316. For instance, both the object unpacker 328 and object distributor 332 can be resident on the system manager 364. As another example, the object distributor 332 may be provided in the system manager 364 and each server that receives a sub-component (e.g., 336, 356, 372) may have its own object unpacker 328.

In some embodiments, when the service warehouse 108 generates and sends an object to the enterprise 304, the boundary device 308 may route the message(s) containing the object to the communication server 316. As can be seen in FIG. 6, an object 604 may comprise multiple constituent parts such as a user portal sub-component 608, a set of deployment instructions 612, a call-processing sub-component 616, and a system manager sub-component 620. Each of these sub-components may specifically designed to be sent to and executed by a different server.

Accordingly, once received at the communication server 316, the object unpacker 328 is configured to identify the various constituent parts of the object 604 and extract them from the object 604. In some embodiments, each sub-component of the object 604 may correspond to a different file, executable (e.g., instruction set), set of files, or set of executables. Unpacking the object 604 may simply correspond to the object unpacker 328 extracting each file/executable corresponding to each sub-component and temporarily storing the extracted file/executable at memory in the communication server 316.

The object unpacker 328 may then invoke the object distributor 332 to distribute the various sub-components to the appropriate servers 336, 356, 364, 372 in accordance with the deployment instructions 612 contained within the object 604. More specifically, the object distributor 332 may refer to the deployment instructions 612 and cause the call-processing sub-component 616 to be deployed to either the application server 336 (e.g., as an application sub-component 340) or another part of the communication server 316. The user portal sub-component 608 may be deployed to the user portal 356 (e.g., as a user-portal sub-component 360). The system manager sub-component 620 may be deployed to the system manager server 364 (e.g., as a system manager sub-component 368). Once deployed by the object distributor 332, each sub-component of the now-deployed object 604 can be executed by its corresponding server. In some embodiments, the deployed sub-components can work in cooperation with one another to provide the full functionality of a service.

As a non-limiting example, if the downloaded object 604 corresponds to a new communication application (e.g., a call-recording service, a dynamic device pairing service, a call-forwarding service, a voicemail service, a call log service, a caller identification service, an encryption service, etc.), when such a service is needed for a user during a communication session, the user may be provided with the service by the combined execution of each sub-component on each server 316, 336, 356, 364, 372. More specifically, the call-processing sub-component 340 stored on and executed by the application server 336 may be the sub-component 340 that is sequenced into the communication session as a B2BUA. The user portal sub-component 360 may enable a user to view and/or configure the particular service, his/her preferences for the service, and perform other functions related to the service (e.g., via a web-based user interface). The system manager sub-component 368 may enable the user and/or a system administrator (e.g., an administrator of the enterprise network 304) to control permissions and/or user access to the service. Much like the user-portal sub-component 360, the system manager sub-component 368 may also be made available via a web-based user interface or the like.

As will be described in further detail herein, even though the object 604 is deployed throughout the network 304 (e.g., for a customer 112), it may be possible to limit which users are allowed to access and use the service or service version. In other words, users of the network 304 may not necessarily have access to every service deployed in the network 304 and some users may have access to different services or service versions than other users.

Although only one communication server 316, two application servers 336, one user portal server 356, and one system manager server 364 are depicted, one skilled in the art will appreciate the one, two, three, or more of any type of server can be provided and each server may be configured to provide one or more of the functions discussed herein.

The applications that can be included in a particular application sequence (e.g., via the communication server 316 and application server 336) are generally included to accommodate the user's preferences 324 and to provide communication services in accordance therewith. It should be appreciated, however, that the user preferences, in some embodiments, are only within the bounds of services enabled for the user by the system administrator. Furthermore, some services assigned by the administrator may not be capable of being disabled by the user based on user preferences (e.g., mandatory call recording services assigned to the user by the administrator may not be capable of being disabled).

Applications may vary according to media-type, function, and the like. Exemplary types of applications that can be provided via the sub-components 340 include, without limitation, an EC-500 application, a call setup application, a voicemail application, an email application, a voice application, a video application, a text application, a conferencing application, a call recording application, a communication log service, a security application, an encryption application, a collaboration application, a whiteboard application, mobility applications, presence applications, media applications, messaging applications, bridging applications, and any other type of application that can supplement or enhance communications. Additionally, one, two, three, or more applications of a given type can be included in a single application sequence without departing from the scope of the present invention.

The communication server 316, application server 336, user portal server 356, and system manager server 364 may correspond to but a few types of servers that can be deployed in the network 304. Other servers 372 may be provided that includes other sub-component types 376. Suitable examples of such servers 372 and/or sub-component types 376 include, without limitation, management servers/agents, user-provisioned data stores, serviceability servers/agents, media processing servers/agents, Voice eXtensible Markup Language (VXML) stores, content stores, email servers, voicemail servers, calendaring servers, conferencing servers, presence servers, and other types of servers known to provide particular services to client devices. In some embodiments, the other servers 372 may also be considered application servers 336, which provide one or more applications for use in a communication session.

The internal communication devices 348 can be similar or identical to communication devices outside the network 304 except the internal communication devices 348 are provisioned, and often owned, by the enterprise administering the network 304. Illustrative types of communication devices 348 include, without limitation, cellular phones, smartphones, laptops, Personal Computers (PCs), Personal Digital Assistants (PDAs), digital phones, analog phones, and/or any other type of capable phone, softphone or digital telephone. Examples of suitable telephones include the 1600™, 2400™, 4600™, 5400™, 5600™, 9600™, 9620™, 9630™, 9640™, 9640G™, 9650™, 9608™, 9611™, 9621™, 9641™, and Quick Edition™ telephones, IP wireless telephones (such as Avaya Inc.'s IP DECT™ phones), video phones (such as Avaya Inc.'s Videophone™), and softphones such as Avaya Flare™.

The data store 352 can be configured to includes enterprise subscriber information, such as name, job title, electronic address information (e.g., telephone number, email address, instant messaging handle, direct dial extension, and the like), subscriber contact lists (e.g., contact name and electronic address information), other employee records, user preferences 324, and the like. Information contained in the data store 352 can be made available to one or more of the servers 316, 336, 356, 364, 372 via various types of databases, servers, etc.

The various servers and components depicted in FIG. 3 may be implemented separately (i.e., on different servers) or together (i.e., on a single server). In particular, two or more depicted components (e.g., communication server 316 and application server 336) may be implemented on a single server without departing from the scope of the present invention. Thus, a single device may provide the functionality of several components depicted separately in FIG. 3. As another example, the boundary device 308 and communication server 316 may be implemented on a single device.

Figure 4:
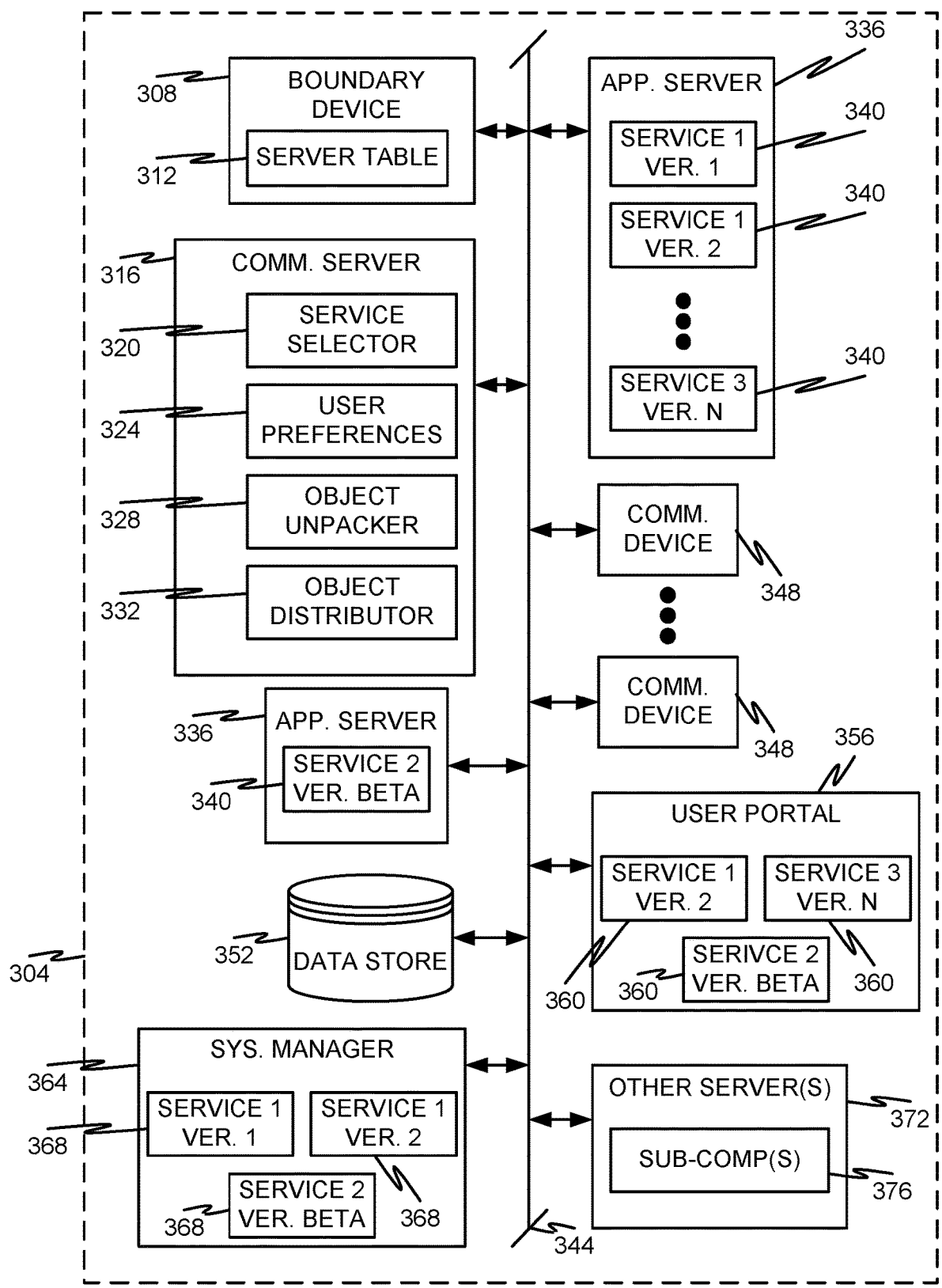
FIG. 4 is a block diagram of a third communication system in accordance with embodiments of the present disclosure.

As can be seen in FIG. 4, a particular sub-component deployed on a server (e.g., a system manager sub-component 368 deployed on the system manager server 364) may correspond to a particular service type and version of that service type. Several different service types or different versions of the same service type can be deployed on a single server without departing from the scope of the present disclosure. Service types may be broadly defined (e.g., communication service, web service, media service, etc.) or narrowly defined as a specific product offered by a specific company (e.g., Avaya one-X® Communicator, Avaya one-X® Mobile, Avaya IP Office, AvayaLive™ Connect, Avaya Aura® Conferencing, Unified Messaging, Avaya Flare™ Experience, WebEx™ Collaboration Services, speech analytics or data mining services such as those provided by Aurix™, etc.). If sub-components of a common service type and version of that service type are provided on multiple different servers, then those sub-components may cause the different servers to cooperate with one another in a way that seamlessly provides the common service type and version of that service type. Although not shown, it should be appreciated that templates (see FIG. 7) can be administered and assigned to users on the system manager 364. Those administered templates can then be accessed by other servers to determine the services/versions available to a given user.

As mentioned above, although a licensing sub-component is not depicted, a licensing sub-component can be also deployed, perhaps on a licensing server. Other servers (e.g., system manager 364) can then check with the licensing server to make sure the appropriate licenses are present to allow the user of that service. This license information could include the number of users that can have the service assigned in the template and system manager 364 would not allow more users to be assigned the service than allowed by the licensing sub-component.

Figure 5:
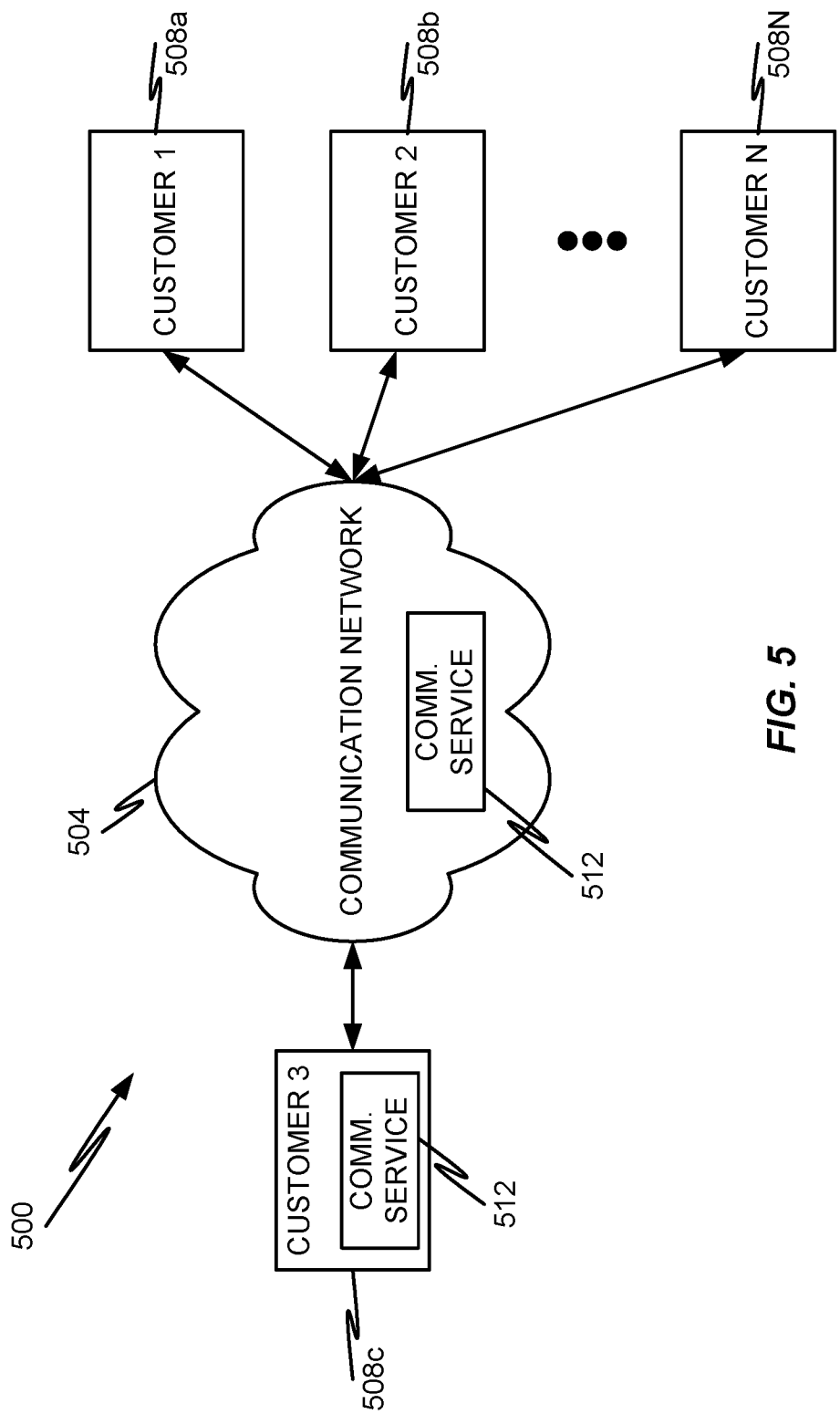
FIG. 5 is a block diagram of a fourth communication system in accordance with embodiments of the present disclosure.

FIG. 5 depicts a communication system 500 in accordance with at least some embodiments of the present disclosure. The communication system 500 comprises a shared communication service 512 that is made available to a plurality of different customers 508 *a*-N. One of the customers (e.g., the third customer 508*c*) may comprise a network 304 as depicted in FIGS. 3 and 4 with a plurality of physical servers on their premises. The servers may contain various communication services 512 in the form of sub-components that have been deployed from an object 604. One or more of the communication services 512 (or any other type of service) can be shared with other customers 508*a*, 508*b*, 508N in accordance with embodiments of the present disclosure. Access to the shared communication services 512 can be controlled at the customer's premises via the use of permission templates (see FIG. 7) in the same way that a single enterprise or customer controls a per-user access to such services.

FIG. 5 also shows that a shared communication service 512 may reside within the communication network 504 (e.g., as a cloud-based communication service 512). The cloud-based communication service 512 may be shared amongst two or more customers 508 in a secure manner—meaning that data from one customer will not be inadvertently shared with another customer. This security can be achieved by maintaining secure or sensitive data locally at the customer's premises or in an encrypted form if the data is maintained at a shared server or data store 352.

Referring back to FIG. 6, it has already been described how an object 604 may comprise a plurality of sub-components 608, 616, 620 and a set of deployment instructions 612 that, when followed or executed by the object distributor 332, cause the various sub-components 608, 616, 620 to be distributed to different servers in a network 304. In some embodiments, the deployment instructions 612, in addition to containing instructions to deploy the object 604 once downloaded by a customer 112 *a*-N, may also contain other information that described the object 604. More specifically, the deployment instructions 612 may also include product documentation, user manuals, administration manuals, configuration guidelines, and any other type of data that describes the object. In some embodiments, the deployment instructions 612 may be provided in the form of one or more Enterprise Archive (EAR) files and/or a Web application Archive (WAR) files. Likewise, the sub-components 608, 616, 620 can also be packaged in the object 604 as one or more EAR and/or WAR files.

An EAR file is a file format used by Java EE for packaging one or more modules into a single archive so that the deployment of the various parts of that single archive on a single server can occur simultaneously and coherently. Thus, once an EAR file of a particular sub-components has been directed to a particular server (e.g., a user-portal sub-component 360 has been deployed to the user portal server 356 in accordance with the deployment instructions 612) the inherent nature of the EAR file will cause that particular sub-component to be deployed within the particular server seamlessly. Similar to an EAR file, a WAR file is a Java Archive (JAR) file used to distribute a collection of JavaServer Pages, Java Servlets, Java classes, XML files, tag libraries, static web pages (HTML and related files) and other resources that together constitute a web application. The JAR file format used by the WAR file is an archive file format used to aggregate many Java class files and associated metadata and resources into one file to easily distribute the application software or libraries on the Java platform.

In some embodiments, some of the sub-components of the object 604 may be packaged as an EAR file while other sub-components of the object 604 may be packaged as a WAR file. The type of file used for the sub-component will depend on the nature of the sub-component and the capabilities of the server that will eventually receive and deploy the sub-component. As a non-limiting example, the call-processing sub-component 616 and deployment instructions may be provided as EAR files whereas the system manager sub-component 620 and user portal sub-component 608 may be provided as WAR files.

With reference now to FIG. 7, additional details of a template 700 that can be used to control per-user access to a service or per-customer access to a shared service 512 will be described in accordance with at least some embodiments of the present disclosure. Although many details of the template 700 will be described in connection with controlling per-user access to services, it should be appreciated that teachings with respect to per-user access can be easily applied to per-customer access to a shared service 512. Furthermore, although the template 700 will be described with respect to a particular structure (e.g., a table structure), it should be appreciated that embodiments of the present disclosure are not so limited. More specifically, any type of data structure or collection of data structures can be used to provide the features of the template 700 discussed herein.

A template 700 may comprise a number of data fields that can be provisioned by an end-user of a service and/or by a system administrator. The types of data fields that may be included in the template 700 include, without limitation, a user identifier field 704 and a plurality of service identifier fields 708, 712, 716.

The user identifier field 704 may identify a particular user in an enterprise network. For example, the user identifier field 704 may identify an employee of a customer 112*a*-N, a customer of a business, an administrator of a business, a group of employees, a group of customers, etc. The user identifier field 704 may also be used as an identifier of customers if a communication service 512 is shared amongst a plurality of different customers. Any string of numbers, characters, symbols, bits, or the like can be used to uniquely identify a user or customer in the user identifier field 704. Examples of data that can be used to identify a user include, without limitation, name, address, social security number, employee number, title, aliases (e.g., Address of Record (AoR)), etc. Examples of data that can be used to identify a customer include, without limitation, company name, company abbreviations, trademarks, numbers, etc.

Each service identifier fields 708, 712, 716 may correspond to a different service that is available to a user by virtue of the fact that a corresponding object 604 has been downloaded at the network 304 and the required sub-components 608, 616, 620 have been distributed to the appropriate servers within the network 304. Once an object 604 is downloaded and deployed at the network 304, a new field that identifies the service provided by the object 604 may be added to the template 700.

Default settings for user access to a service may be defined within the downloaded object 604 (e.g., via the deployment instructions 612) and/or they may be defined by rules created by a system administrator of the network 304. As an example, the default settings for user access may define that no user is allowed access to the corresponding service. Representation of such a permission or lack thereof is depicted with respect to the first communication service identified in the first service identifier field 708 for user 3.

As another example, the purchaser of the service from the service warehouse 108 (e.g., an administrator of network 304) may define which users will initially be allowed to use the service at the time of purchase. The object generator 216 at the service warehouse 108 may construct the object 604 in accordance with the purchaser's request. In particular, the deployment instructions 612 may define that when the newly created field is created in the template 700, only the users identified by the purchaser will have access to the service. All other users will not be allowed access to the service.

In the depicted table structure, the intersection between a user's row and the service type's column may be used to define what access permissions the user is allowed to have with respect to the service. These permissions may be statically defined for a specific version of the service type. Alternatively, the permissions may comprise a wildcard value that defines the user is allowed to access a range of versions of the corresponding service type (e.g., any version earlier than version X). Alternatively, the permissions may comprise a value that allows the user to access any version or the latest version of a particular service.

An advantage to using the template 700 is that different users of the same enterprise and within the same network 304 can have different access permissions for a service. As can be seen in the example of FIG. 7, user 1 is allowed access to version 1.0 of communication service 2 identified in field 712 whereas user 2 is allowed access to version 1.1 of the same communication service. The field 712 also defines that group A of users are not allowed any access to communication service 2 but group B is allowed access to version 3.1 of the same communication service. If there is a conflict between permissions defined individually for a user versus permissions defined on a group basis for the same user (e.g., user 1 is a part of group A), then the permissions may be controlled by the user's individually defined permissions. It may be advantageous, however, to have certain conflicts be controlled by group permissions rather than individual permissions.

In some embodiments, the template 700 may be included in the user preferences 324 and may be referred to by the service selector 320 when determining which service types and versions thereof a user is allowed to access. While the template 700 may be provided as part of the user preferences 324, it may be possible to restrict a user from changing, editing, or writing data to some or all of the template 700. In other words, just because the template 700 is included in the user preferences 324 does not necessarily make the entire template 700 available to the user for editing. It may be possible, however, to allow the user to edit portions of the template 700 within certain parameters that are either defined by the network 304 administrator or the provider of the service (e.g., the operator of the service warehouse 108).

Figure 8:
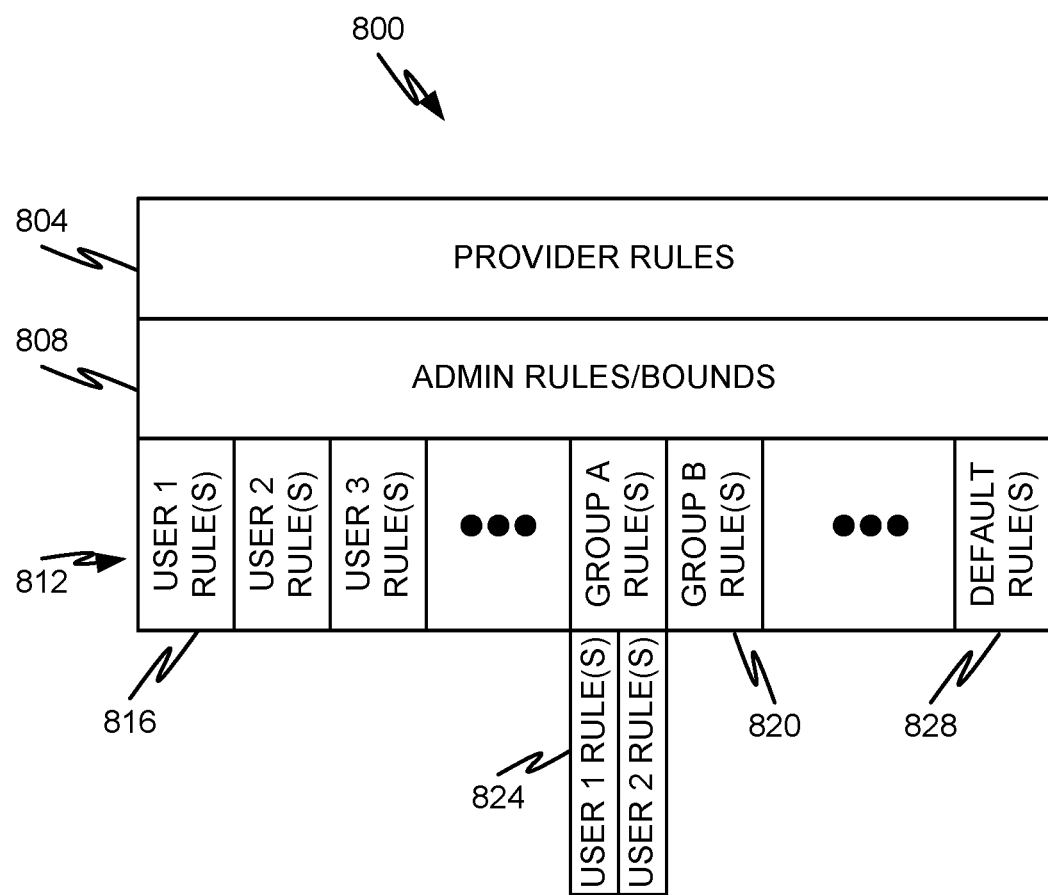
FIG. 8 is a block diagram depicting a data structure used in connection with administering services in accordance with embodiments of the present disclosure.

With reference now to FIG. 8, a data structure 800 used to allow the hierarchical definition and alteration of rules with respect to a service will be described in accordance with at least some embodiments of the present disclosure. The data structure 800 may be integrated into the template 700 or it may be separate from the template 700. As an example, if user 1 defines certain rules for communication service 1 within data structure 800, those user-defined rules may either be copied into the intersection of user 1's row and field 708. Alternatively, a pointer from the intersection of user 1's row and field 708 may point to the corresponding location in data structure 800. The data structure 800 may be included in the user preferences 324 or made available to the service selector 320 remotely.

In some embodiments, the data structure 800 comprises hierarchically structured rules that enable a user to define any type of operating parameter, rule, or permission with respect to a particular service as long as it is within a permissible set of rules defined hierarchically by the provider of the service and the network 304 administrator. More specifically, the data structure 800 may comprise, for each service available within a network 304, a first layer of rules 804, a second layer of rules 808, a third layer of rules 812, a fourth layer of rules 824, etc. In some embodiments, the first layer of rules 804 comprises provider-defined rules for the particular service, the second layer of rules 808 comprises administrator-defined rules for the service, the third layer of rules 812 comprises either user-defined rules 816, group-defined rules 820, or default rules 828 for the service, and the fourth layer of rules 824 comprises user-defined rules within the group defined rules 820.

The first layer of rules 804 may control options available to the lower layers of rules. As an example, if the provider defines that a particular service can have one of three types of user interfaces (e.g., three different skins for a web interface), then the administrator, users, and groups may be allowed to pick which of the three interfaces are to be used by a particular user when accessing the service.

The second layer of rules 808 further refine the first layer of rules 804, but cannot broaden or extend beyond the first layer of rules 804. Continuing the above example, the administrator may define within the administrator rules that only the first and second types of user interfaces will be made available to users for the particular service. The administrator is not allowed to define a fourth interface type outside of the interface types defined by the provider.

Similar to the second layer of rules 808, the third layer of rules 812 can further refine the second layer of rules 808 and first layer of rules 804, but not broaden or extend beyond the first and second layer of rules 804, 808. Again continuing the interface example, the user may be allowed to select between the first and second types of user interfaces for the particular service. The user is not allowed to select the third interface because it has been restricted by the administrator and is not allowed to select a fourth interface because it has not been enabled by the provider. The user rule 816 may specifically define the user's selection for the service or it may refer to the default rules 828 if the user has not defined their selection.

Much like the user rules 816, the group rules 820 and user rules 824 may be used by users or groups of users to further refine a preference for a service or an aspect of a service. It should be appreciated that the rules defined within the data structure 800 are not limited to defining which interface a users employs to access a service. To provide another use case for the data structure 800, a provider 804 may provide a service to a customer 112 via a downloadable object 604. The service may correspond to a particular communication service type (e.g., dynamic device pairing, routing rules, EC500, etc.).

Consider, for example, that the particular communication service type is a first communication service and the first communication service has 10 different versions. The latest versions (e.g., versions 9 and 10) are supported by the service provider and the earliest versions (e.g., versions 1 and 2) are no longer supported by the service provider. In this scenario, the provider may define within the first layer of rules 804 that only versions 3-10 of the service are available. Continuing this scenario, the administrator may only have purchased licenses to versions 7-9 for all users and may only have purchased a license to version 10 for user 1 (e.g., a test user). The administrator can define within the second layer of rules 808 that versions 7-9 are available to all users of the network 304 whereas version 10 is only available to user 1. The administrator may also define the version of the service that will be used if a user does not select a service version for their use (e.g., via default rules 828). Any user or user group will then be allowed to select a specific version of the service among versions 7-9 while user 1 will be allowed to select a specific version of the service among versions 7-10. This enables the system administrator to test out new versions of a service without having to purchase a license for the service for every user in the network 304. It also allows each user to have some latitude in selecting the version of the service that they employ. Thus, early adopter-type users are allowed to select newer versions of the service whereas late adopter-type users are allowed to keep using the older version to which they have grown accustomed.

Figure 9:
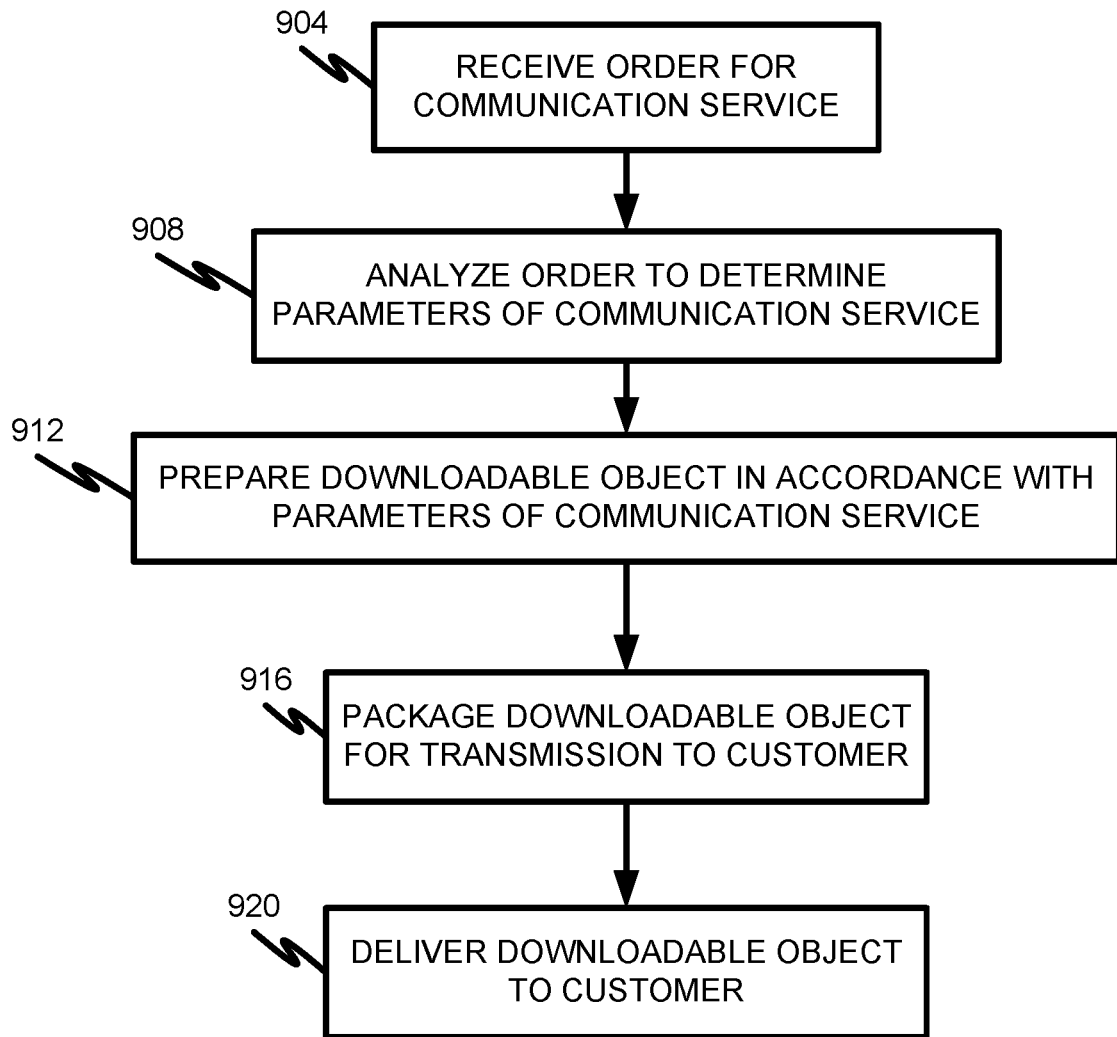
FIG. 9 is a flow diagram depicting a method of delivering a downloadable object in accordance with embodiments of the present disclosure.

With reference now to FIG. 9, a method of receiving and fulfilling an order for a service, such as a communication service, will be described in accordance with at least some embodiments of the present disclosure. The method begins when an order for a service is received at the service warehouse 108 (step 904). In some embodiments, the order for a service may be received via the customer portal 208 (e.g., as a web-based request).

The method continues with the object generator 216 analyzing the order to determine parameters of the requested service (step 908). Specifically, the object generator 216 may determine from the parameters of the request what service has been requested, what version of the service has been requested, what sub-components 228 are required to build the specified version of the service, what deployment instructions 612 will be required to properly distribute the sub-components at the purchaser's premises, how many licenses for the service have been purchased, which users will initially be permitted access to the service, which users will initially be denied access to the service, provider rules for the service, and/or what types of servers the purchaser has at their premises to support the service. Additionally, in some embodiments, the order may include metadata that describes one or more aspects of the current service and/or the desired service. For example, an order may comprise metadata describing whether or not a particular existing service or components of that service have certain capabilities, such as High Availability (HA) capabilities. The metadata contained within the order may help define which types of updates are available to or required by the customer to successfully update the service.

Based on the analysis of the order, the object generator 216 prepares the downloadable object 604 in accordance with the parameters of the request (step 912). Specifically, the object generator 216 retrieves the required sub-components 228 and builds the object 604. The sub-components 228 may be packaged within the object 604 as one or more of an EAR file and WAR file. Moreover, the deployment instructions 612 may be packaged as an executable, EAR file, WAR file, text file, or the like.

The retrieved sub-components may then be packaged into the object 604 and prepared for transmission to the purchaser/customer 112 via the communication network 104 (step 916). In this step, the object generator 216 may prepare the object 604 as one or more packets to be transmitted via a communications channel established over the communication network 104 between the service warehouse 108 and the customer 112. This may include attaching the object 604 to one or more electronic messages (e.g., an email message, SMS message, or the like), packetizing the object 604 into one or more packets that are capable of transmission across the communication network 104, or the like. The object generator 216 and/or object delivery interface 212 may perform the packaging step.

Thereafter, the downloadable object 604 is delivered from the object delivery interface 212 to the purchaser via the communication network 104 (step 920). As discussed above, this transmission step may include sending one or more electronic messages or packets that include some or all of the object 604.

Figure 10:
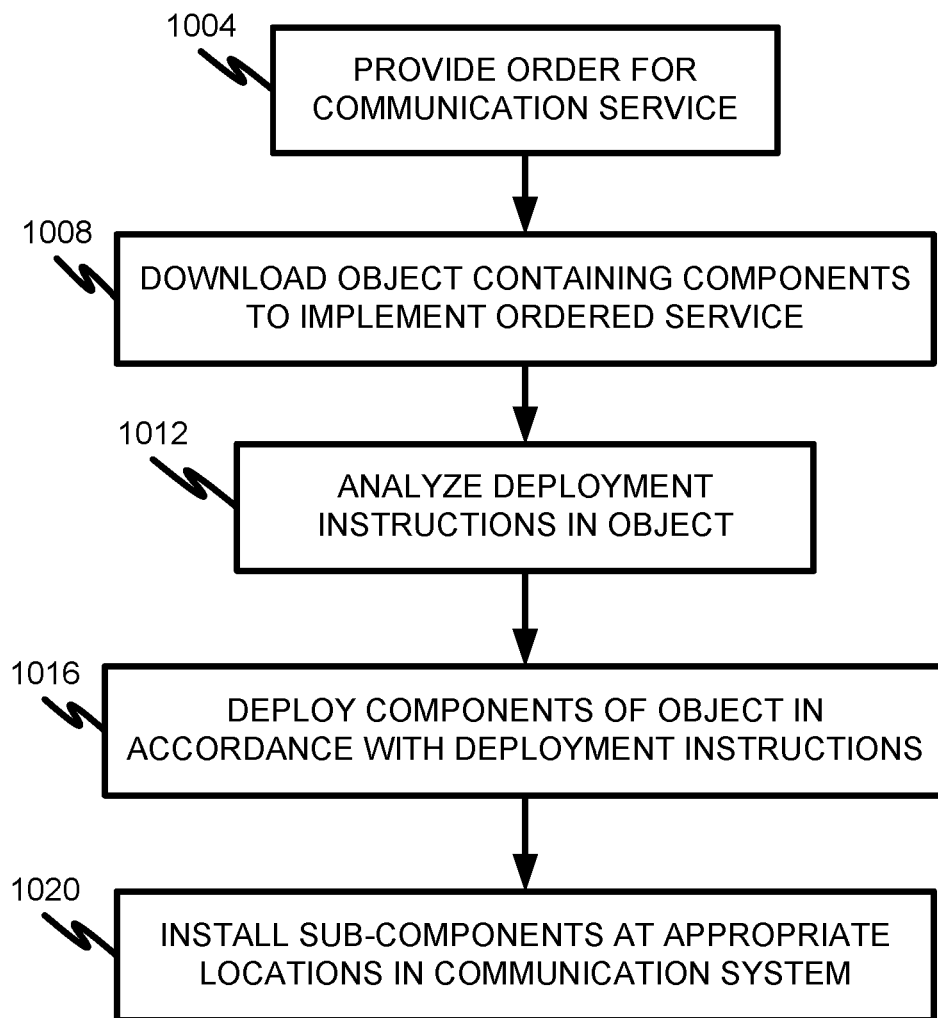
FIG. 10 is a flow diagram depicting a method of deploying and installing a downloadable object in accordance with embodiments of the present disclosure.

With reference now to FIG. 10, a method of deploying and installing a downloadable object 604 will be described in accordance with embodiments of the present disclosure. The method is initiated when a customer 112 (e.g., a system administrator of one or more networks 304) provides an order for a service, such as a communication service (step 1004). After the order for the service has been placed, the steps of FIG. 9 are performed and the customer 112 waits until the downloadable object 604 is received at the network 304. The downloadable object 604 may initially be received at the boundary device 308 and may subsequently be routed to the communication server 316 where it is initially downloaded (e.g., stored in persistent or temporary memory on the communication server 316 or some other server 372) (step 1008).

The next step is for the object unpacker 328 and/or object distributor 332 to analyze the deployment instructions 612 to determine the contents of the object 604 and where each sub-component is to be directed within the network 304 (step 1012). Based on the deployment instructions 612, the various sub-components 608, 616, 620 of the object 604 are deployed to their corresponding servers 316, 336, 356, 364, 372 within the network 304 (step 1016). Upon receiving the sub-component, the receiving server will unpack the sub-component (e.g., unpack the EAR or WAR file) and install it within the server according to the instructions contained within the sub-component (step 1020). As a non-limiting example, the user portal sub-component 608 may be deployed to the user portal server 356 where it is stored as sub-component 360, the call-processing sub-component 616 may be deployed to the application server 336 where it is stored as sub-component 340, and the system manager sub-component 620 may be deployed to the system manager server 364 where it is stored as sub-component 368.

Figure 11:
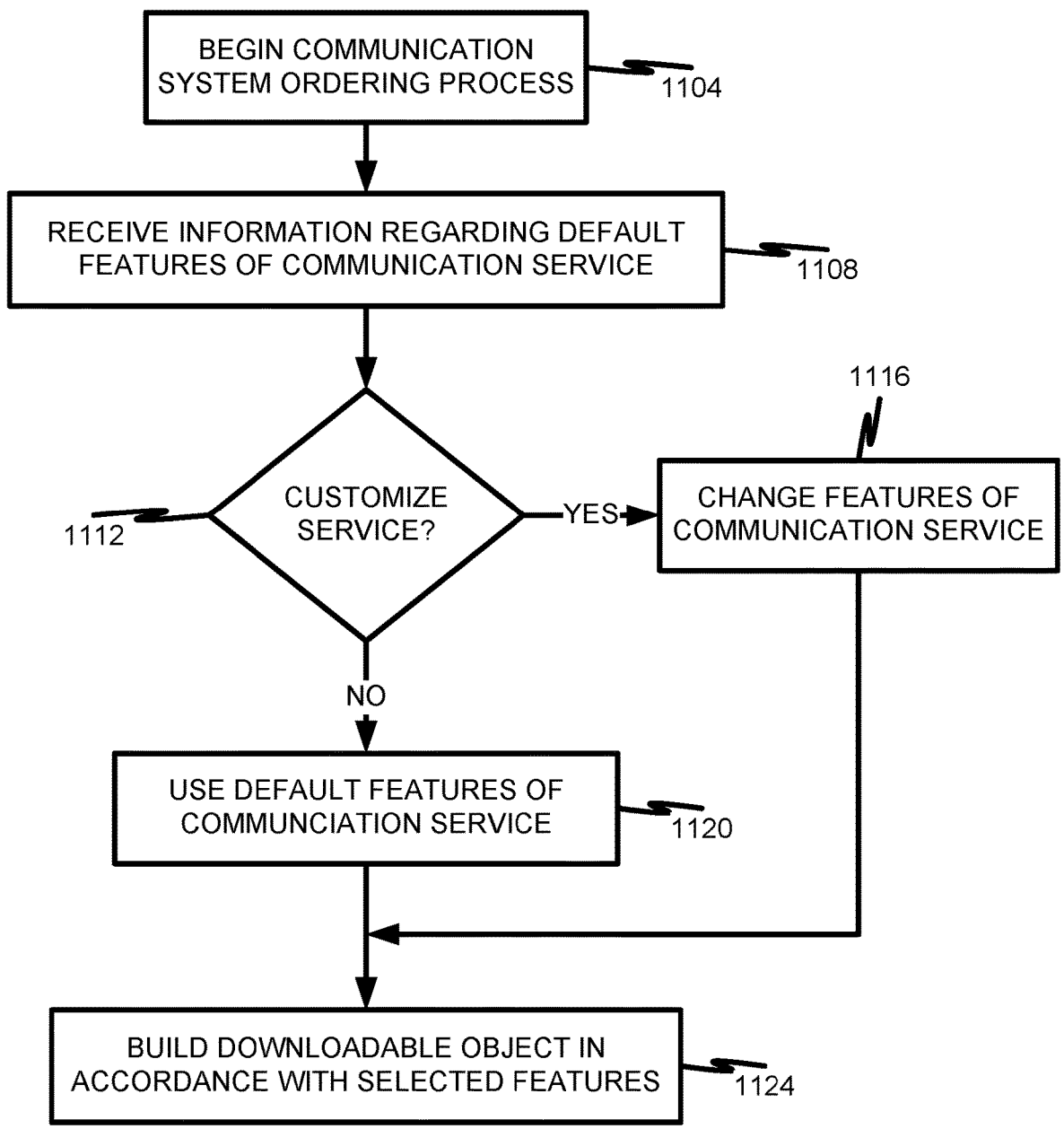
FIG. 11 is a flow diagram depicting a method of customizing a downloadable object in accordance with embodiments of the present disclosure.

With reference now to FIG. 11, a method of customizing a downloadable object 604 will be described in accordance with embodiments of the present disclosure. The method begins much like the method of FIG. 10 with a customer 112 placing an order for a service, such as a communication service (step 1104). The method continues with the object generator 216 receiving information regarding the default features to be included in the communication service along with default rules 828 that will cause the service to behave in accordance with the default features (step 1108). In some embodiments, the default features may comprise a set of base rules and/or a range of rules that define acceptable or unacceptable use. Moreover, the default features may define which sub-components are provided for the service unless specialized sub-component are requested or ordered.

The object generator 216 then compares the default features of the service as determined in step 1108 with the features defined by the purchaser in step 1104 to determine if a customized service is to be generated specifically for this order (step 1112). In some embodiments, the purchaser may not define any special features for the service, in which case default features and default rules may be used for the generation of the object 604 (step 1120). In some embodiments, the purchaser may define one or more customized aspects of the service that are different from the default features of the service or the purchaser may define that certain users are to receive default features of the service and other users are to receive customized features (step 1116).

When the purchased service comprises one or more customized features, the object generator 216 may retrieve the necessary sub-components and alter the sub-components themselves, deployment instructions 612 for the object 604, provider rules 804, and/or default rules 828 for the service. After the required features and rules have been selected, the object generator 216 may build the downloadable object 604 in accordance with the selected features (step 1124).

Figure 12:
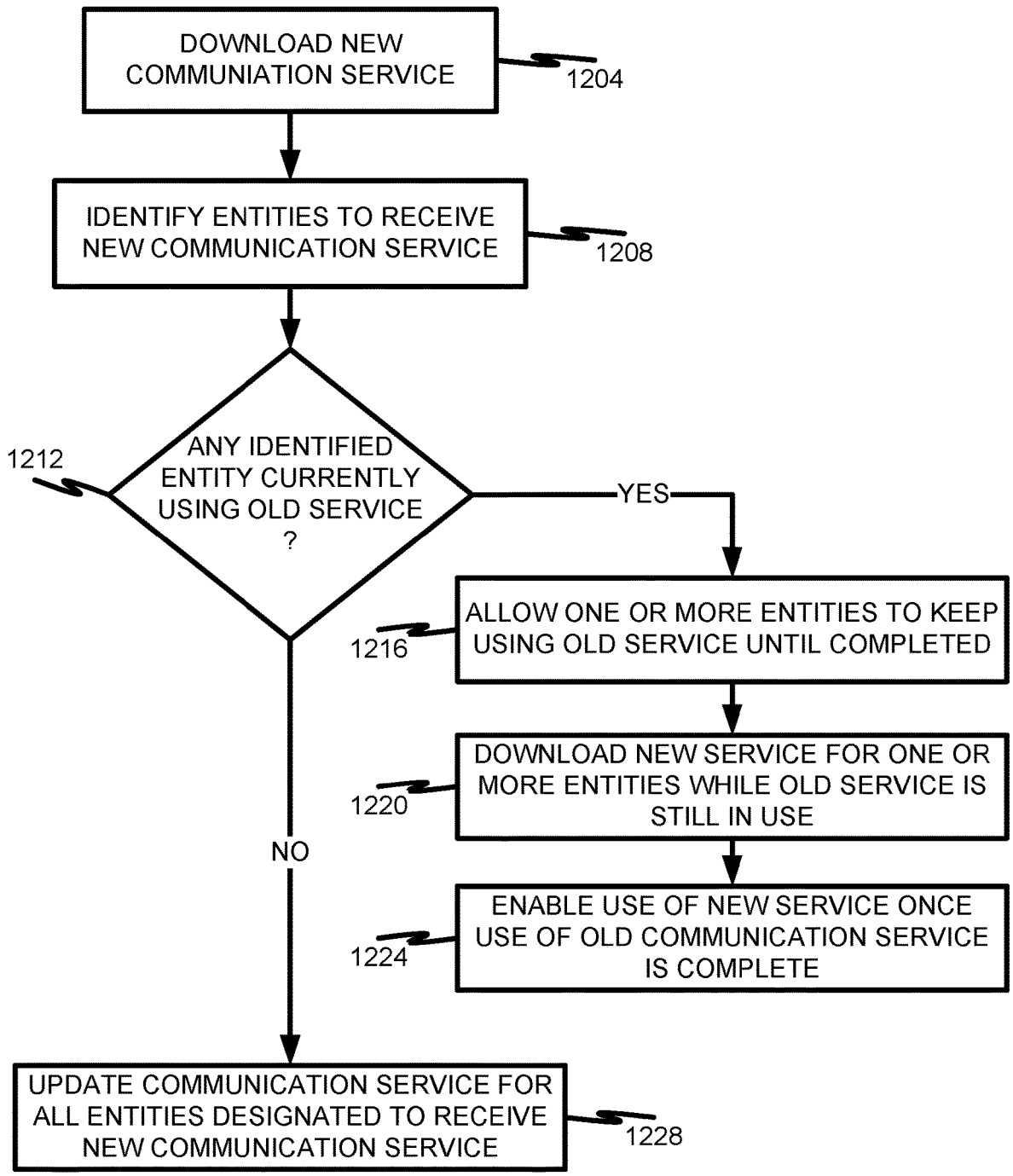
FIG. 12 is a flow diagram depicting a method of deploying a service during system run-time in accordance with embodiments of the present disclosure.

With reference now to FIG. 12, a method of deploying a service during system run-time will be described in accordance with embodiments of the present disclosure. Although the method will be described in connection with a communication service, it should be appreciated that embodiments of the present disclosure are not limited to communication services and may be employed with the run-time deployment of any type of service such as web-based services, media services, presence services, etc.

The method is initiated when a new service is received at the purchaser's premises (e.g., some component of network 304) (step 1204). The object unpacker 328 and/or object distributor 332 may be configured to identify which entities (e.g., users) within the network 304 are to receive the service or be allowed access to the service once installed (step 1208). Prior to installing the various sub-components of the service, the object distributor 332 may further determine whether any identified entity is currently using an older version of the service that has just been received (step 1212). More specifically, if a service has been upgraded or replaced by the newly-downloaded service, the object distributor 332 may determine whether any user identified set to receive the service is currently using an older version of that service.

If the query of step 1212 is answered negatively, then the method proceeds with the object distributor 332 distributing the sub-components of the object 604 in the normal fashion and each server that receives a sub-component is allowed to immediately install its corresponding sub-component and make the installed sub-component available to any user upon request (step 1228).

However, if the query of step 1212 is answered negatively, the method continues with the object distributor 332 distributing the sub-components to the appropriate servers, but additional mechanisms are invoked to ensure that the user(s) currently using the old version of the service are not interrupted. Specifically, the object distributor 332 may distribute the various sub-components of the object 604 to the servers and the servers may install the new sub-components. At the same time, the users currently using the old service version are allowed to continue using the service until they have completed its use (step 1216). This may be accomplished in a number of ways. For example, the object distributor 332 may instruct the server that receives the sub-component to download and install the sub-component but only use the sub-component for new requests for the service (step 1220). In other words, requests for a service that were received prior to the server receiving the sub-component may continue to be processed by the old version of the service (e.g., the old sub-component).

This may also be accomplished by informing the service selector 320 that messages received in connection with an old communication session (e.g., a session established prior to receiving and downloading the object 604) should continue to be routed to the servers and sub-components that were initially invoked for the communication session. The service selector may be instructed to only invoke the new sub-components for communication sessions established after the installation of the sub-components for the new service. This enables the new service to be used by users after they have finished using the old service, even if the old service version was in use during the download and installation of the sub-components of the new service (step 1224).

To provide a more concrete but non-limiting example, consider a new voicemail system being received at the communication server 316 and that new voicemail system is to replace an older voicemail system. If an object 604 containing the sub-components for the new voicemail system is received while a first user is currently using the old voicemail system, the object distributor 332 may still cause the necessary sub-components to be distributed to the corresponding servers where they are installed. This distribution and installation may occur while the first user is currently using the old voicemail system. A second user may try to connect to the voicemail system while the first user is still using the old voicemail system and the service selector 320 may connect the second user with the new voicemail system even though the first user is still using the old voicemail system. This routing may occur due to the service selector 320 referring to the user preferences 324 and the version definitions provided in the template 700. This may also occur for other users that were not using the old voicemail system while the new voicemail system was being installed. Once the first user has completed his/her session with the old voicemail system, any new requests from the first user to connect with the voicemail system will be routed by the service selector 320 to the sub-components that provide the new voicemail system. Accordingly, the first user is not interrupted during the installation of the new voicemail system and other users are immediately able to access the new voicemail system once it has been installed.

Another example scenario may occur whereby a user continues to use an older version of a service even after a newer version of the same service has been installed. Specifically, as long as the user is assigned to use the older version rather than the newer version, that user may continue to use the older version instead of the newer version.

Figure 13:
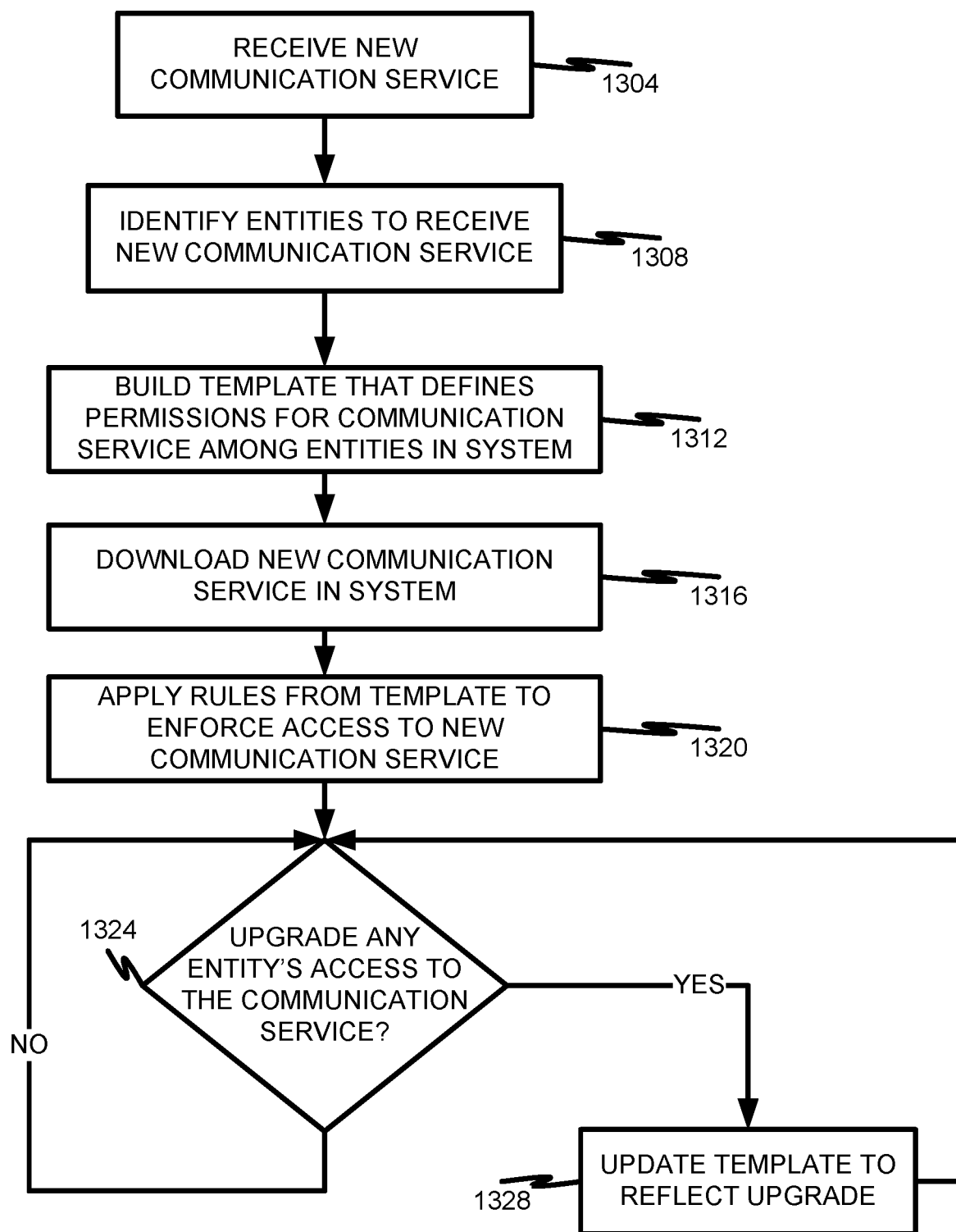
FIG. 13 is a flow diagram depicting a method of upgrading a service in accordance with embodiments of the present disclosure.

With reference now to FIG. 13, a method of upgrading a service will be described in accordance with embodiments of the present disclosure. The method begins when a new service is received at a customer's premises (step 1304). The method continues with the object unpacker 328 and/or object distributor 332 identifying the entities to receive the new service (step 1308). This information may be defined within the object 604 (e.g., via the deployment instructions 612 or it may be defined in some other location (e.g., within the system manager sub-component 620). Based on the information obtained in step 1308, the object distributor 332 builds a template 700 or adds a field to an existing template 700 such that the template 700 defines the permissions for the new service among various entities within the network 304 (step 1312).

After the template 700 has been built or updated, the object distributor 332 causes the new service to be distributed to the appropriate servers and installed therein such that the new service is made available within the network 304 (step 1316). Once installed, the service selector 320 is capable of applying/enforcing the rules defined within the template 700 as well as rules contained within any other data structure defining user permissions and the like to any request for that service (step 1320). As an example, if a user attempts to make an outgoing phone call after the new service has been installed and the new service corresponds to a call recording-type service, a speech-to-text service, a conversational analytics service, or the like, then the service selector 320 may, upon receiving the message that initiates the call, route the message through one or more sub-components 340, 360, 376 so that the new version of the service is used for the user's outgoing call.

Over time the template 700 may be updated to add a user to the new service, remove a user from the new service, add a group to the new service, remove a group from the new service, etc. Changes to the template 700 may be initiated via a user interacting with the system manager sub-component 368, the user portal sub-component 360, or any other module within the network 304 that enables the viewing and editing of the template 700. If it is determined that a change to the template 700 is required (step 1324), the system manager sub-component 368 and/or the user portal sub-component 360 may instruct the communication server 316 to update the corresponding fields in the template 700 if the template 700 is being maintained at the communication server 316. In any event, the server responsible for managing the template 700 will be instructed to update the template to reflect the change (step 1328). Thereafter, the method returns to step 1324.

In some embodiments, rather than returning directly to step 1324, an additional step of removing/uninstalling may be performed. Specifically, after every user of a communication system has been migrated away from an old service version, the old service version and all associated sub-components may be uninstalled from their corresponding servers.

In some embodiments, individual components may be upgraded during a service upgrade rather than upgrading every component of the service. More specifically, if the original service has a first call-processing component, a first user-portal component, and a first licensing component (e.g., for 10 users), the original service may be upgraded to an upgraded service by simply updating one or more of the original service's components. As an example, if a customer only wants to upgrade the license part of their service, it may only be necessary to update the licensing component of the service to a second licensing component (e.g., for 20 users) without having to updating any other component of the service. It should be appreciated that depending upon which component of the service is upgraded, the costs associated with that service may need to be adjusted.

Figure 14:
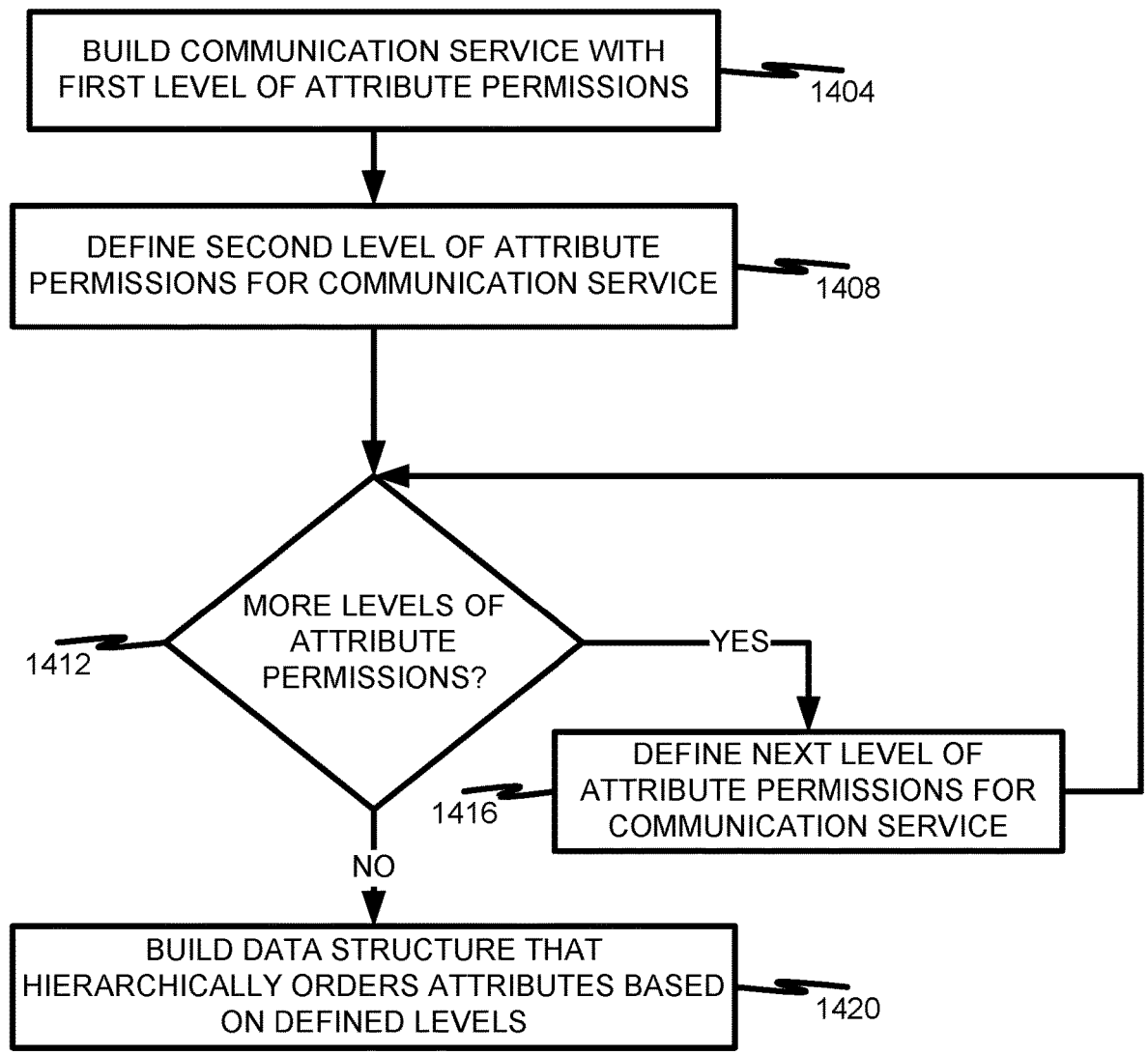
FIG. 14 is a flow diagram depicting a method of hierarchically structuring attributes for a service in accordance with embodiments of the present disclosure.

With reference now to FIG. 14, a method of hierarchically structuring attributes or rules for a service will be described in accordance with embodiments of the present disclosure. In some embodiments, the service and the object 604 representing the service is built and delivered to a customer with a first level of attribute permissions 804 (step 1404). This first level of attribute permissions 804 may correspond to provider rules and may be default rules or a range or rules. In some embodiments, the purchaser may define during the ordering process that a second level of attribute permissions 808 should be included in the object 604 (step 1408). Alternatively, or in addition, the purchaser may define the second level of attribute permissions 808 after the object 604 is received at the network 304. Regardless of when the second level of attribute permissions 808 are defined, the second level of attribute permissions 808 are created within the data structure 800 to further refine or limit the first level of attribute permissions 804.

The method continues by determining if any more levels of attribute permissions will be incorporated into the data structure 800 to further limit the second level of attribute permissions 808 (step 1412). If this query is answered affirmatively, a next level of attribute permissions are defined for the service (step 1416). Steps 1412 and 1416 may be repeated as necessary until the desired number of hierarchical levels are created. Once all desired levels of attribute permissions have been created, the method continues with the construction of the data structure 800 that hierarchically orders the attributes based on the defined levels (step 1420). Thus, the first level of attribute permissions define the broadest bounds of the attribute permissions (e.g., as a range or list of permissible attributes) and the lower levels of the attribute permissions further define the attributes or rules within the boundaries of all higher levels of attribute permissions.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

The invention claimed is:

1. In a communication system comprising a plurality of users, a method comprising:
defining, by a processor for first and second users in the plurality of users, a set of enabled services or service versions that the first and second users are allowed to access from the communication system, wherein the set of enabled services or service versions is packaged into a file format comprising multiple components and multiple possible subcomponents of each of the components; and
enabling, by the processor, the first and second users to select specific configurations of the subcomponents to provide first and second user configured sets of enabled services or service versions that the first and second users, respectively, are allowed to access from the communication system, wherein each of the first and second user configured sets of enabled services or service versions comprise a subcomponent not contained in the other of the first and second user configured sets of enabled services or service versions.

2. The method of claim 1, wherein the set of enabled services or service versions is pluggable into the communication system and wherein the file format is one of JAR or WAR file.

3. The method of claim 1, wherein the set of enabled services or service versions enable the first and second users to customize dynamically the set of enabled services or service versions to form the first and second user configured sets of enabled services or service versions, respectively, each of the first and second user configured sets of enabled services or service versions possessing different personalities selected by the corresponding one of the first and second users.

4. The method of claim 1, wherein the multiple components comprise plural of a call processing component, a service rule component, a user portal/interface component, and a system manager or administrator component and wherein the first and second user configured sets of enabled services or service versions cause the processor to behave differently.

5. In a communication system comprising a plurality of users, a method comprising:
defining, by a processor for a first user in the plurality of users, a first set of enabled services that the first user is allowed to access from the communication system;
defining, by the processor for a second user in the plurality of users, a second set of enabled services that the second user is allowed to access from the communication system, wherein the first set of enabled services is a first version of a first service and wherein the second set of enabled services is a later second version of the first service; and
enabling, by the processor, the first and second users to use concurrently the first and second sets of enabled services on the communication system.

6. The method of claim 5, further comprising:
defining, with the processor, the first and second sets of enabled services with one or more templates, wherein the one or more templates comprise a user identifier field identifying a subset of the plurality of users and a plurality of service identifier fields, each of the plurality of service identifier fields corresponding to a different service or service version that is available to the identified subset of the plurality of users.

7. The method of claim 6, wherein the one or more templates define access permissions for the identified subset of the plurality of users has with respect to each of the different services corresponding to the plurality of service identifier fields.

8. The method of claim 7, wherein the first and second sets of enabled services are provided to the communication system by a provider, wherein an administrator administers the first and second set of enabled services for the communication system, wherein the microprocessor applies hierarchically structured rules that enable the identified subset of the plurality of users to define any type of operating parameter, rule, or permission with respect to each of the different services corresponding to the plurality of service identifier fields, the hierarchically structured rules comprising a first layer of rules that comprise provider-defined rules for each of the different services corresponding to the plurality of service identifier fields, a second layer of rules that comprise administrator-defined rules for each of the different services corresponding to the plurality of service identifier fields, and a third layer of rules that comprise user-defined rules for each of the different services corresponding to the plurality of service identifier fields, wherein the first set of rules controls options available through the second and third sets of rules and the second set of rules controls options available through the third set of rules, wherein the second set of rules is defined within the first set of rules and does not extend beyond the first set of rules, and wherein the third set of rules is defined within the second set of rules and does not extend beyond the second set of rules.

9. The method of claim 5, wherein the first set of enabled services comprises a first call-processing service that is in the second set of enabled services, wherein the second set of enabled services comprises a second call-processing service that is not in the first set of enabled services, and wherein the second call-processing service comprises at least one of a ringing feature, an extension-to-cellular feature, a call recording feature, a forking feature, a voicemail feature, a dynamic device pairing feature, a call history feature, a user interface feature, an encryption feature, a presence feature, a media feature, or a data storage feature.

10. The method of claim 5, further comprising:
receiving, with the processor, an object that contains multiple sub-components that enable deployment of one or more enabled services;
causing, with the processor, a first sub-component in the multiple sub-components to be installed on a first server in the communication system;
causing, with the processor, a second sub-component in the multiple sub-components to be installed on a second server in the communication system; and enforcing, with the processor, the first and second user's use of the communication system with one or more templates, wherein the one or more templates describe the one or more enabled services for each user and settings for the one or more enabled services.

11. In a communication system comprising a plurality of users, a method comprising:
- deploying, by a processor, a newer service or service version to replace or upgrade, respectively, an older service or service version;
- assigning, by the processor, the newer service or service version to a first user while the first user is using the older service or service version to perform a first instance of a telecommunication function; and
- when the first user has completed the first instance of the telecommunication function, enabling, by the processor, the first user to perform a second instance of the telecommunication function using the newer service or service version.

12. The method of claim 11, wherein the telecommunication function is a communication session and wherein deployment of the newer service or service version is performed without downtime of any part of the communication system.

13. The method of claim 11, wherein the telecommunication function is a communication session and wherein the processor deploys the newer service or service version without replacing the older service or service version.

14. The method of claim 11, wherein the telecommunication function is a communication session and wherein the processor deploys the newer service or service version without requiring the first user to log off or discontinue the communication session.

15. The method of claim 11, further comprising:
- enabling, with the processor and while the first user is performing the first instance of the telecommunication function, the first user to have access to the newer service or service version without interrupting the first user's use of the older service or service version.

* * * * *